(12) United States Patent
Namekawa et al.

(10) Patent No.: US 7,532,062 B2
(45) Date of Patent: May 12, 2009

(54) SEMICONDUCTOR CHARGE PUMP USING MOS (METAL OXIDE SEMICONDUCTOR) TRANSISTOR FOR CURRENT RECTIFIER DEVICE

(75) Inventors: Toshimasa Namekawa, Tokyo (JP); Hiroshi Ito, Yokohama (JP)

(73) Assignee: Kabusiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/138,005

(22) Filed: Jun. 12, 2008

(65) Prior Publication Data

US 2008/0246535 A1    Oct. 9, 2008

Related U.S. Application Data

(62) Division of application No. 11/556,810, filed on Nov. 6, 2006, now abandoned.

(30) Foreign Application Priority Data

Nov. 8, 2005  (JP) ............... 2005-323601
Sep. 28, 2006 (JP) ............... 2006-266050

(51) Int. Cl.
    *G05F 1/10*   (2006.01)
(52) U.S. Cl. ............... 327/536; 363/59; 363/60
(58) Field of Classification Search ............... 327/536; 363/59, 60
    See application file for complete search history.

(56) References Cited

U.S. PATENT DOCUMENTS

| | | | |
|---|---|---|---|
| 4,922,402 A | 5/1990 | Olivo et al. | ............ 363/60 |
| 5,066,870 A | 11/1991 | Kobatake | ............ 327/536 |
| 5,939,935 A * | 8/1999 | Merritt | ............ 327/536 |
| 6,191,963 B1 | 2/2001 | McPartland et al. | ............ 363/60 |
| 6,278,315 B1 | 8/2001 | Kim | ............ 327/536 |
| 6,603,346 B2 | 8/2003 | Sawada et al. | ............ 327/536 |
| 6,690,227 B2 | 2/2004 | Lee et al. | ............ 327/536 |
| 6,864,739 B2 | 3/2005 | Shor et al. | ............ 327/536 |
| 6,952,129 B2 | 10/2005 | Lin et al. | ............ 327/536 |
| 6,992,522 B2 | 1/2006 | Ido | ............ 327/536 |
| 7,102,422 B1 | 9/2006 | Sawada et al. | ............ 327/536 |
| 7,190,211 B2 | 3/2007 | Nakagawa et al. | ............ 327/536 |
| 7,221,610 B2 | 5/2007 | Yamazoe et al. | ............ 365/226 |
| 2008/0049485 A1 | 2/2008 | Matsufuji et al. | |

OTHER PUBLICATIONS

John F. Dickson, "On-Chip High-Voltage Generation in MNOS Integrated Circuits Using an Improved Voltage Multiplier Technique," IEEE Journal of Solid-State Circuits, vol. SC-11, No. 3, Jun. 1976, pp. 374-378.

Toru Tanzawa, et al., "A Dynamic Analysis of the Dickson Charge Pump Circuit," IEEE Journal of Solid-State Circuits, vol. 32, No. 8, Aug. 1997, pp. 1231-1240.

* cited by examiner

*Primary Examiner*—Kenneth B. Wells
(74) *Attorney, Agent, or Firm*—Oblon, Spivak, McClelland, Maier & Neustadt, P.C.

(57) ABSTRACT

A semiconductor charge pump includes a plurality of P-channel MOS transistors being connected in series, a plurality of first pumping capacitors one electrode of each of which is connected to a connection point of each of the P-channel MOS transistors, a clock signal generating circuit which generates first and second clock signals whose phases are different from each other by 180 degrees, the first and second clock signals being alternately supplied to the other electrodes of the first pumping capacitors. The semiconductor charge pump further includes a plurality of dynamic level converter circuits each including a resistor element and a second pumping capacitor and connected to each of gates of the P-channel MOS transistors.

5 Claims, 12 Drawing Sheets

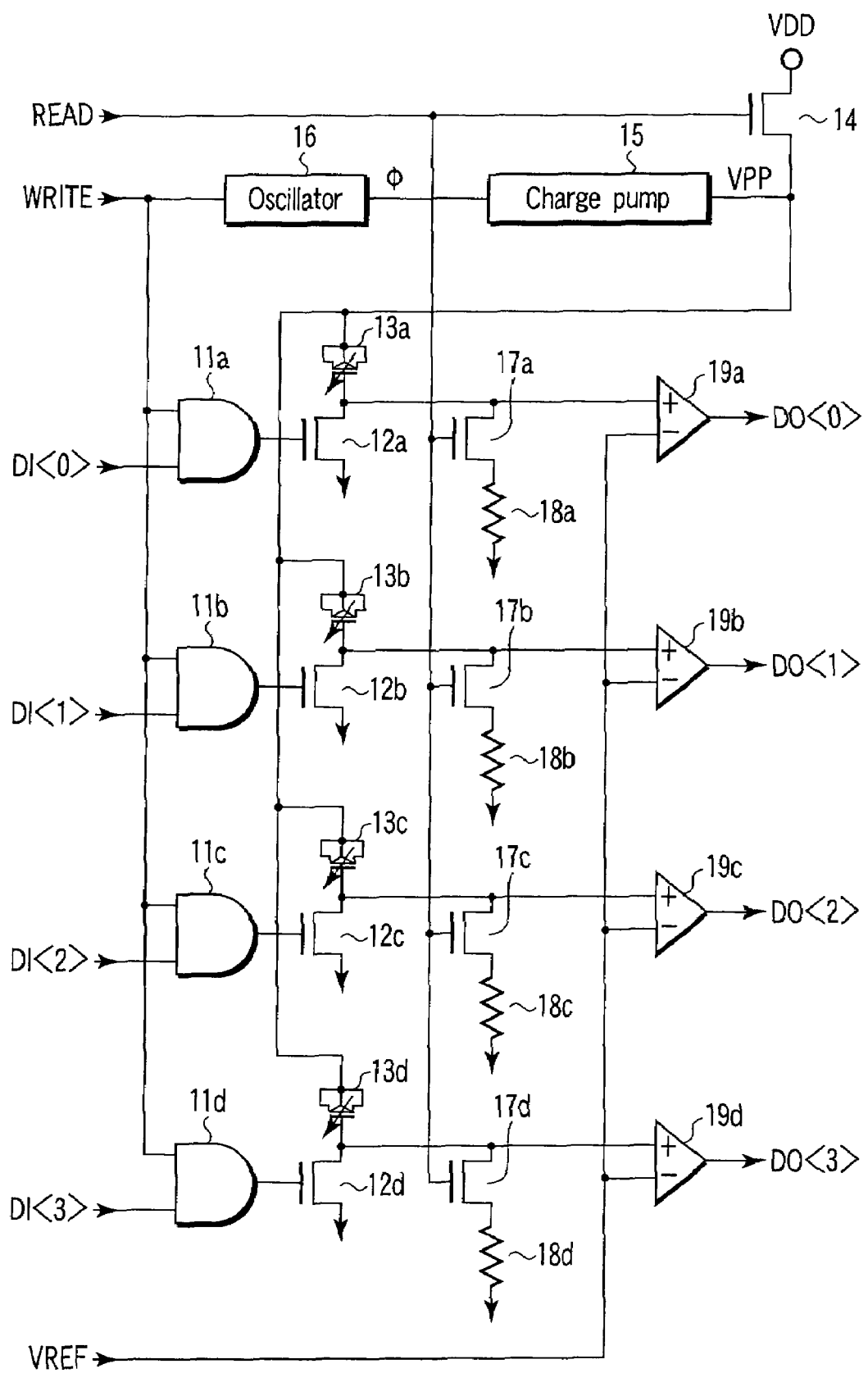
F I G. 1

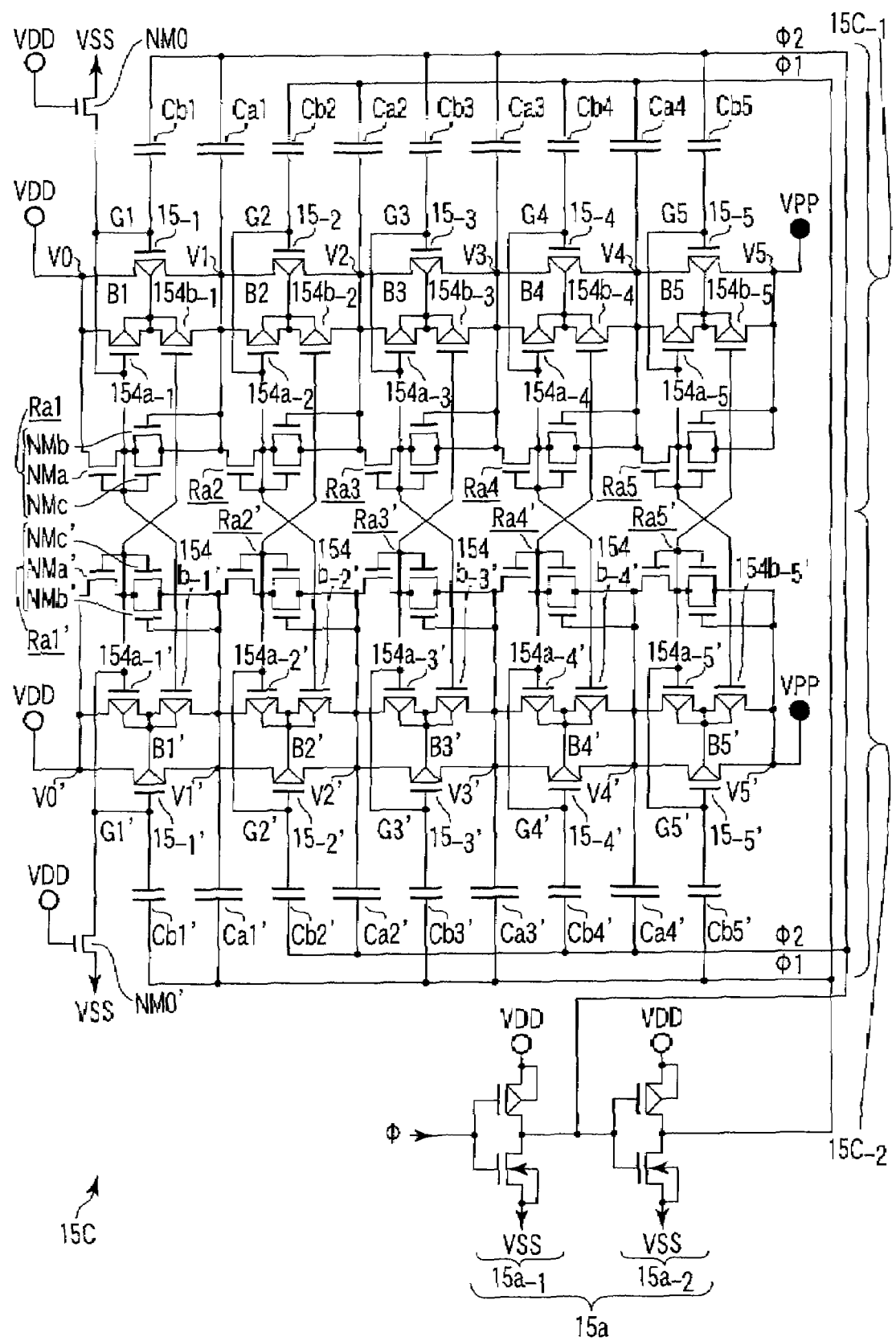
F I G. 10

SEMICONDUCTOR CHARGE PUMP USING MOS (METAL OXIDE SEMICONDUCTOR) TRANSISTOR FOR CURRENT RECTIFIER DEVICE

CROSS-REFERENCE TO RELATED APPLICATIONS

This application is a divisional application of and claims the benefit of priority under 35 USC §120 of application Ser. No. 11/556,810, filed on Nov. 6, 2006, now abandoned and claims the benefit of priority under 35 USC §119 from Japanese Patent Applications No. 2005-323601, filed Nov. 8, 2005; and No. 2006-266050, filed Sep. 28, 2006, the entire contents of both of which are incorporated herein by reference.

BACKGROUND OF THE INVENTION

1. Field of the Invention

The present invention relates to a semiconductor charge pump, and more particularly to a Dickson type voltage increasing charge pump using MOS transistors for a current rectifier element.

2. Description of the Related Art

In recent years, there has been prevalent a nonvolatile semiconductor memory device featured in that even if power is down, no information is lost. In particular, there is a high demand for such a nonvolatile semiconductor memory device in management of information relating to redundancy of memory devices or maintaining chip specific information, a trimming process of an analog circuit, a speed matching process of a high speed computation logic or the like. Common requests for the nonvolatile semiconductor memory device in these uses include that a memory capacity may be about several thousands bits at most (may be small in size); that there is no need for rewriting information as long as it has been written once; that packaging on chip is inexpensive or the like. Namely, there has been a request for "inexpensively packaging a small-scale nonvolatile semiconductor memory device on the same chip".

An irreversible nonvolatile semiconductor memory device using a fuse element for a memory element meets such a request. However, the conventional fuse element has been formed so as to thermally weld a wiring layer by means of laser irradiation. Therefore, the nonvolatile semiconductor memory device using a fuse element of this type has a disadvantage that information cannot be written after chip sealing (packaging) has been done.

In contrast, recently, a so called gate oxide film destruction type anti-fuse element has been used as a memory element for a nonvolatile semiconductor memory device formed to apply a high voltage to a gate oxide film of a MOS transistor and utilize a breakdown phenomenon of an oxidization insulation film. In the case of this irreversible nonvolatile semiconductor memory device using the anti-fuse element, it is possible to write information after sealing.

On the other hand, in terms of the nonvolatile semiconductor memory device, there is well known a nonvolatile semiconductor memory device capable of electrically erasing information. A nonvolatile semiconductor memory device of this type includes: a Flash EPROM (Electrically Programmable Read Only Memory); an MRAM (Magnetic Random Access Memory); and a FeRAM (Ferroelectric Random Access Memory). In the case of the nonvolatile semiconductor memory device of this type, specific memory elements are used, respectively, in order to package a number of large-scale memory elements in a small area. However, a dedicated manufacturing process is necessary for forming specific memory elements. The use of the dedicated manufacturing process increases a manufacturing cost. In addition, the use of the dedicated manufacturing process causes the following problems. For example, the above use of the process causes degradation of memory characteristics of other memory elements packaged, respectively, on the same chip; increases characteristic degradation or characteristic variation of an analog circuit element; and causes speed characteristic degradation of transistors for a high speed computation logic. Therefore, the request for "inexpensively packaging a small-scale nonvolatile semiconductor memory device on the same chip" is not satisfied in the case of such a nonvolatile semiconductor memory device capable of electrically erasing information.

A specific manufacturing process is not required to form a memory element in the case of the above-described irreversible nonvolatile semiconductor memory device using a gate oxide film destruction type anti-fuse element. Thus, this memory device is suitable for a request for "inexpensively packaging a small-scale nonvolatile semiconductor memory device on the same chip". However, an information write operation requires a high voltage. Therefore, in order to ensure packaging on the same chip, it is indispensable to achieve means for supplying a high voltage.

The simplest high voltage supply means can include a configuration such that high voltage power is supplied from the outside of the chip via an external supply pin. With this configuration, there is a danger that electrostatic breakdown of a fuse element occurs due to electrostatic application to the external supply pin. Thus, it is necessary to additionally provide a protective element to the external supply pin for protecting the fuse element from electrostatic breakdown. However, this configuration must meet a contradictory specification such that it permits high voltage application for storing information in the fuse element, whereas it prevents high voltage (electrostatic) application that causes electrostatic breakdown of the fuse element. Therefore, it is not permissible to additionally provide the protective element to the external supply pin. This makes it impossible to utilize an advantage of a gate oxide film destruction type anti-fuse element that information can be written after sealing.

Another means for supplying a high voltage can include a configuration such that a voltage increase power source such as a Dickson type charge pump is packaged on the same chip (for the Dickson type charge pump, reference should be made to J. F. Dickson, "On-chip high-voltage generation in MNOS integrated circuits using an improved voltage multiplier technique," IEEE J. Solid-State Circuits, vol. SC-11, pp. 374-378, June 1976.) However, specific elements such as diodes and high withstand voltage transistors are required to configure the Dickson type charge pump. However, requiring such specific elements reduces an attraction attained by using a gate oxide film destruction type anti-fuse element that does not require a specific manufacturing process for a nonvolatile semiconductor memory device.

For example, in the Dickson type charge pump in which five current rectifier elements have been connected in series, a diode having a dual well structure is indispensable as a current rectifier element in order to normally operate this charge pump. This is because, if a parasitic diode is used for the current rectifier element that configures the Dickson type charge pump, when a PN junction of the parasitic diode is biased in a forward direction, for example, a PNP parasitic bipolar composed of a P+ type diffusion layer being an anode terminal, an N-type well being a cathode terminal, and a P-type substrate becomes electrically conductive. Therefore, a current charged from the anode terminal leaks onto the P-type substrate, and the charge pump does not function normally. In contrast, if a diode having a dual well structure is used for the current rectifier element that configures the Dickson type charge pump, all electrons being minority carriers charged from an N+ type diffusion layer serving as a cathode terminal are collected to the anode terminal without any leak to another node. Therefore, the charge pump functions normally. However, the diode having the dual well structure is high in its manufacturing cost, as compared with that of the parasitic diode. In this case, even if there has been used a gate oxide film destruction type anti-fuse element that does not require a specific manufacturing process, an inexpensive nonvolatile semiconductor memory device cannot be provided.

In the Dickson type charge pump, there has been reported a configuration in which diode-connected N-channel MOS transistors are used as current rectifier elements, and these elements are connected in series. (For example, reference should be made to Toru Tanzawa and Tomoharu Tanaka, "A Dynamic Analysis of the Dickson Charge Pump Circuit", IEEE Journal of solid-state circuits, vol. 32, No. 8, August 1997, pp. 1231-1240). However, in the case of this Dickson type charge pump, a back gate effect of rectification characteristics of the diode-connected N-channel MOS transistors becomes a problem. The back gate effect used here denotes that a voltage (threshold voltage), at which a current starts flowing between a source and a drain, becomes high in accordance with the increase in back gate voltage. In the case where an N-channel MOS transistor having such rectification characteristics has been used as a current rectifier element, a current drive capability is lowered as a voltage-increase voltage of the Dickson type charge pump becomes high, and finally, no current flows. Thus, even in the Dickson type charge pump composed of diode-connected N-channel MOS transistors, it has been impossible to provide an inexpensive nonvolatile semiconductor memory device using a gate oxide film destruction type anti-fuse element.

BRIEF SUMMARY OF THE INVENTION

According to a first aspect of the present invention, there is provided a semiconductor charge pump comprising: a plurality of P-channel MOS (Metal Oxide Semiconductor) transistors which configure current rectifier elements, respectively, said plurality of P-channel MOS transistors having gates and being connected in series between an external supply power source and a voltage increase output power source; a plurality of first pumping capacitors one electrode of each of which is connected to a connection point of each of said plurality of P-channel MOS transistors; a clock signal generating circuit which generates first and second clock signals whose phases are different from each other by 180 degrees, the first and second clock signals being alternately supplied from the clock signal generating circuit to the other electrodes of said plurality of first pumping capacitors; a plurality of resistor elements connected to connection points of said plurality of P-channel MOS transistors at one end and connected to gates of said plurality of P-channel MOS transistors at the other end; and a plurality of second pumping capacitors one electrode of each of which is connected to the other end of each of said plurality of resistor elements, the first and second clock signals being alternately supplied to the other electrodes of said plurality of second capacitors, thereby generating control signals which control gates of said plurality of P-channel MOS transistors.

According to a second aspect of the present invention, there is provided a semiconductor charge pump comprising: a plurality of N-channel MOS (Metal Oxide Semiconductor) transistors which configure current rectifier elements, respectively, said plurality of N-channel MOS transistors having gates and being connected in series between an external supply power source and a voltage increase output power source; a plurality of first pumping capacitors one electrode of each of which is connected to a connection point of each of said plurality of N-channel MOS transistors; a clock signal generating circuit which generates first and second clock signals whose phases are different from each other by 180 degrees, the first and second clock signals being alternately supplied from the clock signal generating circuit to the other electrodes of said plurality of first pumping capacitors; a plurality of resistor elements connected to connection points of said plurality of N-channel MOS transistors at one end and connected to gates of said plurality of N-channel MOS transistors at the other end; and a plurality of second pumping capacitors one electrode of each of which is connected to the other end of each of said plurality of resistor elements, the first and second clock signals being alternately supplied to the other electrodes of said plurality of second capacitors, thereby generating control signals which control gates of said plurality of N-channel MOS transistors.

According to a third aspect of the present invention, there is provided a semiconductor charge pump for two systems, comprising: a plurality of P-channel MOS (Metal Oxide Semiconductor) transistors which configure current rectifier elements, respectively, said plurality of P-channel MOS transistors having gates and being connected in series between an external supply power source and a voltage increase output power source; a plurality of first pumping capacitors one electrode of each of which is connected to a connection point of each of said plurality of P-channel MOS transistors; a clock signal generating circuit which generates first and second clock signals whose phases are different from each other by 180 degrees, the first and second clock signals being alternately supplied from the clock signal generating circuit to the other electrodes of said plurality of first pumping capacitors; a plurality of resistor elements connected to connection points of said plurality of P-channel MOS transistors at one end and connected to gates of said plurality of P-channel MOS transistors at the other end; and a plurality of second pumping capacitors one electrode of each of which is connected to the other end of each of said plurality of resistor elements, the first and second clock signals being alternately supplied to the other electrodes of said plurality of second pumping capacitors, thereby generating control signals which control gates of said plurality of P-channel MOS transistors, wherein, by means of the control signal generated by said plurality of second pumping capacitors in the semiconductor charge pump for one system, gates of said plurality of P-channel MOS transistors in the semiconductor charge pump for the other system are controlled.

According to a fourth aspect of the present invention, there is provided a semiconductor charge pump for two systems, comprising: a plurality of N-channel MOS (Metal Oxide Semiconductor) transistors which configure current rectifier elements, respectively, said plurality of N-channel MOS transistors having gates and being connected in series between an external supply power source and a voltage increase output power source; a plurality of first pumping capacitors one electrode of each of which is connected to a connection point of each of said plurality of N-channel MOS transistors; a clock signal generating circuit which generates first and second clock signals whose phases are different from each other by 180 degrees, the first and second clock signals being alternately supplied from the clock signal generating circuit to the other electrodes of said plurality of first pumping capacitors; a plurality of resistor elements connected to connection points of said plurality of N-channel MOS transistors at one end and connected to gates of said plurality of N-channel MOS transistors at the other end; and a plurality of second pumping capacitors one electrode of each of which is connected to the other end of each of said plurality of resistor elements, the first and second clock signals being alternately supplied to the other electrodes of said plurality of second pumping capacitors, thereby generating control signals which control gates of said plurality of N-channel MOS transistors, wherein, by means of the control signal generated by said plurality of second pumping capacitors in the semiconductor charge pump for one system, gates of said plurality of N-channel MOS transistors in the semiconductor charge pump for the other system are controlled.

BRIEF DESCRIPTION OF THE SEVERAL VIEWS OF THE DRAWING

FIG. 1 is a circuit diagram depicting an example of a configuration of an irreversible nonvolatile semiconductor memory device using a gate oxide film destruction type antifuse element, according to the present invention;

FIG. 10 is a circuit diagram depicting an example of a configuration of a charge pump (voltage increase charge pump) suitable for use in the irreversible nonvolatile semiconductor memory device according to a fourth embodiment of the present invention;

DETAILED DESCRIPTION OF THE INVENTION

Figure 2:
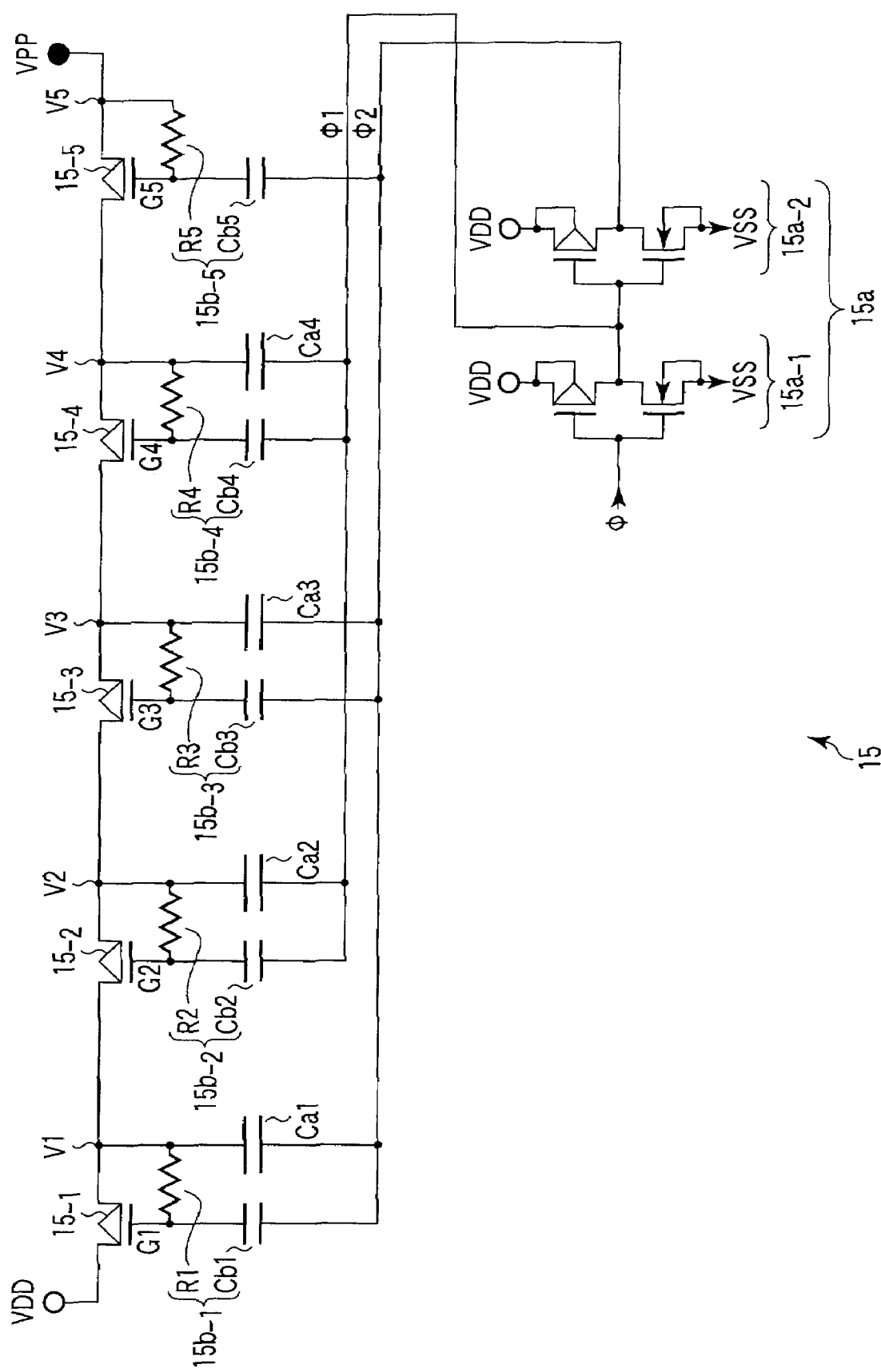
FIG. 2 is a circuit diagram depicting an example of a configuration of a Dickson type charge pump (voltage increase charge pump) suitable for use in the irreversible nonvolatile semiconductor memory device according to a first embodiment of the present invention.
Figure 3:
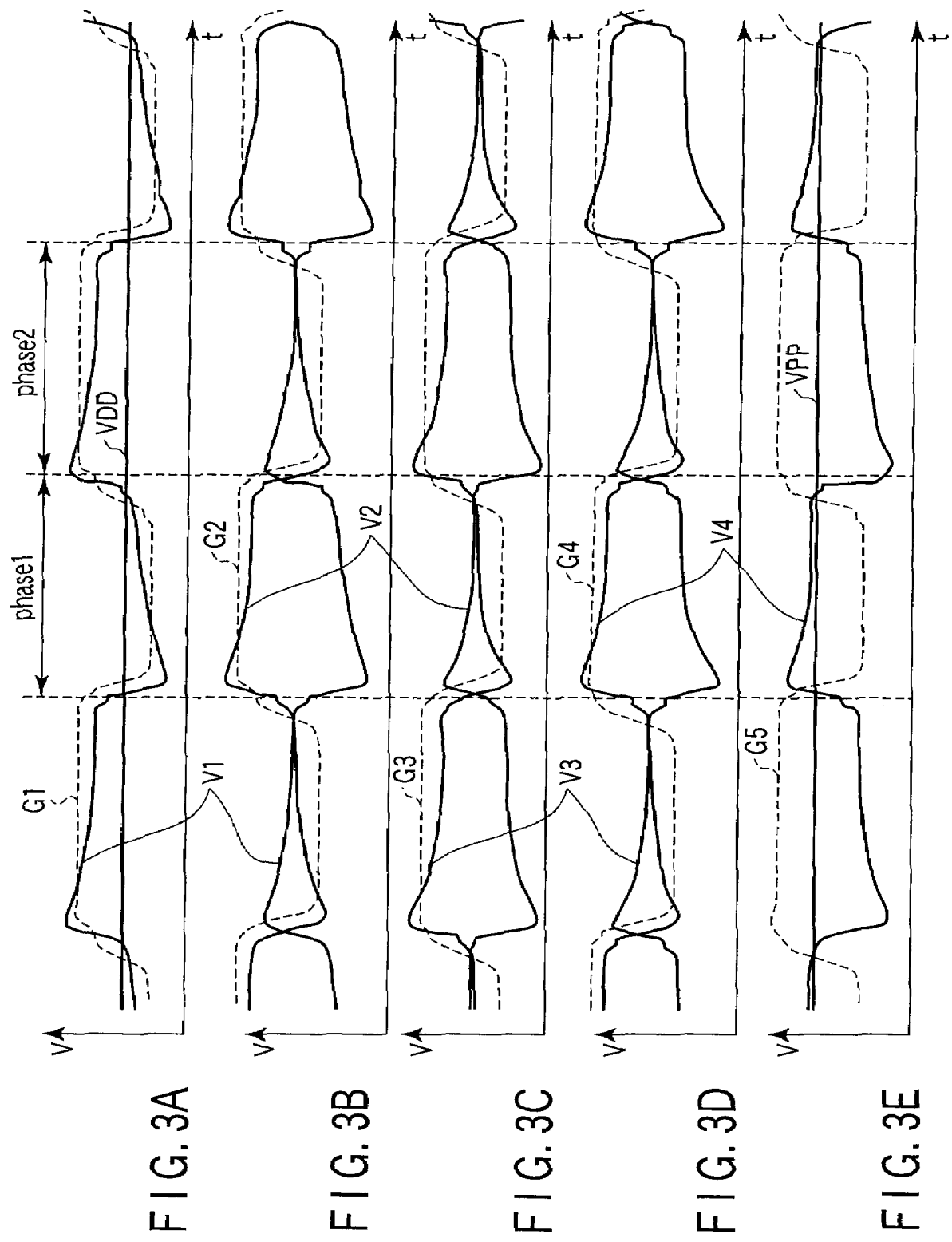
FIGS. 3A to 3E are waveform diagrams each adapted to explain an operation of the Dickson type charge pump shown in FIG. 2.

Embodiments of the present invention will be described with reference to the accompanying drawings. It should be noted that the drawings are schematic ones and the dimension ratios shown therein are different from the actual ones. The dimensions vary from drawing to drawing and so do the ratios of dimension. The following embodiments are directed to a device and a method for embodying the technical concept of the present invention and the technical concept does not specify the material, shape, structure or configuration of components of the present invention. Various changes and modifications can be made to the technical concept without departing from the scope and the claimed invention.

First Embodiment

FIG. 1 shows a basic configuration of a nonvolatile semiconductor memory device using a voltage increase charge pump (described later) in accordance with a first embodiment of the present invention. The present embodiment describes an example of an irreversible nonvolatile semiconductor memory device using a gate oxide film destruction type antifuse element as a memory element, featured in that information rewriting is impossible. This nonvolatile semiconductor memory device is provided as an example in which the number of fuse elements is "4".

For example, data input signals DI <0> to DI <3> are supplied to one input ends of write control logic circuits (AND circuits) 11a to 11d, respectively. A write control signal WTITE (=1) supplied from the outside of the device is inputted to the other input end of each of the write control logic circuits 11a to 11d at the time of a write operation. Output ends of the write control logic circuits 11a to 11d are connected to gates of write control switches 12a to 13d, respectively. The write control switches 12a to 12d each consist of N-channel MOS transistors (hereinafter, referred to as N-type MOS transistors).

One of the source and the drain of each of the above write control switches 12a to 12d (for example, source) is grounded. The other one of the source and the drain of the write control switches 12a to 12d (for example, drain) is connected to one terminal (each gate) of each of gate oxide film destruction type anti-fuse elements 13a to 13d. The gate oxide film destruction type anti-fuse elements 13a to 13d each consist of P-channel MOS transistors (hereinafter, referred to as P-type MOS transistors). One of the source and the drain of a readout power supply circuit (N-type MOS transistor) 14 (for example, source) and a voltage increase charge pump 15 serving as an internal voltage increase power source each are connected to the other terminal (source, drain, or back gate) of each of the gate oxide film destruction type anti-fuse elements 13a to 13d.

An oscillator 16 is connected to the voltage increase charge pump 15. The above write control signal WRITE (high level "=1") is supplied from the outside of the device to the oscillator 16 at the time of a write operation. That is, at the time of the write operation, a clock signal Φ according to the write control signal WRITE (=1) is outputted from the above oscillator 16 to the above voltage increase charge pump 15. In this manner, a voltage increase output power source (electric potential) VPP according to the clock signal Φ is generated by means of the voltage increase charge pump 15. This voltage increase output power source VPP is applied to the source, drain, and back gate of the gate oxide film destruction type anti-fuse elements 13a to 13d, respectively.

An external supply power source VDD is supplied to the other one (drain) of the source and the drain of the above readout power supply circuit 14. A readout control signal READ (=1) is supplied from the outside of the device to the gate of the above readout power supply circuit 14 at the time of a readout operation.

The above readout control signal READ (=1) is supplied to each of the gates of readout load circuits (N-type MOS transistors) 17a to 17d. One of the source and the drain of each of the readout load circuits 17a to 17d (for example, source) is grounded via each of resistors 18a to 18d, respectively. The other one of the source and the drain of each of the readout load circuits 17a to 17d (for example, drain) is connected to each connection point between each of the write control switches 12a to 12d and each of the gate oxide film destruction type anti-fuse elements 13a to 13d.

In addition, non-inverting input end of each of differential amplifiers 19a to 19d is connected to each connection point between each of the write control switches 12a to 12d and each of the gate oxide film destruction type anti-fuse elements 13a to 13d. A reference power source VREF is supplied from the outside of the device to an inverting input end of each of the differential amplifiers 19a to 19d at the time of a readout operation. Data output signals DO <0> to DO <3> are outputted from output ends of these differential amplifiers 19a to 19d, respectively.

In such a configuration, "1" and "0" are provided as a write control signal WRITE and a readout control signal READ, respectively, at the time of a write operation. Then, the oscillator 16 is activated by means of the write control signal WRITE, and then, outputs the clock signal Φ. The voltage increase charge pump 15 having received that clock signal Φ voltage-increases the voltage increase output power source VPP. This voltage increase output power source VPP is applied to the other terminal of each of the gate oxide film destruction type anti-fuse elements 13a to 13d.

In the case where data input signals DI <0>, DI <1>, DI <2>, and DI <3> each are set to "1", each of the outputs of the write control logic circuits 11a to 11d is set to "1". In this manner, the write control switches 12a to 12d become electrically conductive. Then, a high voltage stress (voltage increase output power source VPP) is applied from the voltage increase charge pump 15 to the gate oxide film destruction type anti-fuse elements 13a to 13d. By maintaining this state, the gate oxide film of the anti-fuse elements 13a to 13d then breaks down, and is thermally destructed by a current that flows there. The thermally destructed gate oxide film flows a current, although it is weak. Namely, in the irreversible nonvolatile semiconductor memory device, information is stored while the state in which the gate oxide film has been thermally destructed is set to "1" and a good insulation state before the destruction is set to "0". The thus thermally destructed gate oxide film does not return to its original good insulation state again.

On the other hand, at the time of a readout operation, "1" is provided as a readout control signal READ, and "0" is provided as a write control signal WRITE. Then, the readout load circuits 17a to 17d and the readout power supply circuit 14 become electrically conductive. In this manner, the external supply power source VDD is supplied to the other terminal of each of the gate oxide film destruction type anti-fuse elements 13a to 13d. The external supply power source VDD is, for example, about 1.2V that is a voltage required to read out information from the anti-fuse elements 13a to 13d.

In this case, an anti-fuse element in which no information is written is established in an insulation state, and thus, no current flows. A current flows only in an anti-fuse element in which information has been written. The current flowing in the anti-fuse elements 13a to 13d is detected by means of the readout load circuits 17a to 17d. Namely, an electric potential difference according to the flowing current quantity occurs in the readout load circuits 17a to 17d. The electrical potential difference is compared with a reference power supply VREF by means of the differential amplifiers 19a to 19d. In this manner, it is judged whether or not information is written into the anti-fuse elements 13a to 13d.

Hereinafter, a specific description will be given with respect to a configuration of a Dickson type charge pump suitable for use as a voltage increase charge pump in a nonvolatile semiconductor memory device having a configuration shown in FIG. 1.

FIG. 2 shows an example of a configuration of a Dickson type charge pump in accordance with the first embodiment of the present invention. The present embodiment describes an example in which P-type MOS transistors are used as current rectifier elements and five P-type MOS transistors are connected in series.

As shown in FIG. 2, five P-type MOS transistors $15_{-1}$, $15_{-2}$, $15_{-3}$, $15_{-4}$, and $15_{-5}$ are connected in series between the external supply power source VDD and the voltage increase output power supply VPP. One electrode of each of pumping capacitors (first pumping capacitors) Ca1, Ca2, Ca3, and Ca4 is connected to each one of nodes V1, V2, V3, and V4 serving as serial connection points of the above P-type MOS transistors $15_{-1}$, $15_{-2}$, $15_{-3}$, $15_{-4}$, and $15_{-5}$.

Two clock signals Φ1 and Φ2 each having a phase difference of 180 degrees are alternately supplied from a clock signal generating circuit 15a to the other electrode of each of the above pumping capacitors Ca1, Ca2, Ca3, and Ca4. That is, among the above pumping capacitors Ca1, Ca2, Ca3, and Ca4, for example, the first clock signal Φ1 from a first clock signal generator unit $15a_{-1}$ is applied to the other electrode of each of the pumping capacitors Ca2 and Ca4. In addition, for example, the second clock signal Φ2 from a second clock signal generator unit $15a_{-2}$ is applied to the other electrode of each of the pumping capacitors Ca1 and Ca3.

The first and second clock signal generator units $15a_{-1}$ and $15a_{-2}$ each are composed of an inverter circuit having a complementary MOS (CMOS) structure. The first clock signal Φ1 is generated based on the clock signal Φ from the above oscillator 16. The second clock signal Φ2 is generated based on the clock signal Φ1. The first and second clock signals Φ1 and Φ2 each have a phase difference of 180 degrees.

On the other hand, dynamic level converter circuits $15b_{-1}$, $15b_{-2}$, $15b_{-3}$, $15b_{-4}$, and $15b_{-5}$ are connected to gates of the above P-type MOS transistors $15_{-1}$, $15_{-2}$, $15_{-3}$, $15_{-4}$, and $15_{-5}$, respectively. The dynamic level converter circuits $15b_{-1}$, $15b_{-2}$, $15b_{-3}$, $15b_{-4}$, and $15b_{-5}$ are composed of resistor elements R1, R2, R3, R4, and R5 and auxiliary pumping capacitors (second pumping capacitors) Cb1, Cb2, Cb3, Cb4, and Cb5, respectively. One ends of the resistor elements R1, R2, R3, R4, and R5 are connected to nodes V1, V2, V3, and V4 of the above P-type MOS transistors $15_{-1}$, $15_{-2}$, $15_{-3}$, $15_{-4}$, and $15_{-5}$; and a node V5 between the P-type MOS transistor $15_{-5}$ and the voltage increase output power source VPP. The other ends of the resistor elements R1, R2, R3, R4, and R5 are connected to the gates of the above P-type MOS transistors $15_{-1}$, $15_{-2}$, $15_{-3}$, $15_{-4}$, and $15_{-5}$, and also connected to one electrodes of the auxiliary pumping capacitors Cb1, Cb2, Cb3, Cb4, and Cb5, respectively. The first and second clock signals Φ1 and Φ2 from the above clock signal generating circuit 15a are alternately supplied to the other electrodes of the auxiliary pumping capacitors Cb1, Cb2, Cb3, Cb4, and Cb5.

That is, the dynamic level converter circuits $15b_{-1}$, $15b_{-2}$, $15b_{-3}$, $15b_{-4}$, and $15b_{-5}$ branch a current from the nodes V1, V2, V3, V4, and V5, respectively, via the resistor elements R1, R2, R3, R4, and R5. In addition, an electric charge obtained by each branched current is stored in each of the auxiliary pumping capacitors Cb1, Cb2, Cb3, Cb4, and Cb5. In this state, the other electrode of each of the auxiliary pumping capacitors Cb1, Cb2, Cb3, Cb4, and Cb5 is alternately driven by means of the above first or second clock signal Φ1 or Φ2. In this manner, gate signals (control signals) G1, G2, G3, G4, and G5 of intermediate electric potentials of desired electric potentials, for example, gate voltages, for controlling the gates of the P-type MOS transistors $15_{-1}$, $15_{-2}$, $15_{-3}$, $15_{-4}$, and $15_{-5}$, are generated.

Now, with reference to FIGS. 3A to 3E, a description will be given with respect to an operation of the voltage increase charge pump 15 having the configuration described above. Here, FIGS. 3A to 3E each show a relationship among: outputs (gate signals) G1, G2, G3, G4, and G5 of the dynamic level converter circuits $15b_{-1}$, $15b_{-2}$, $15b_{-3}$, $15b_{-4}$, and $15b_{-5}$; electric potentials of the nodes V1, V2, V3, and V4; the external supply power source VDD; and the voltage increase output power source VPP. Each horizontal axis denotes a time (t), and each vertical axis denotes an electric potential (V).

As shown in FIGS. 3A to 3E, in a period phase 1, the outputs G1, G3, and G5 of the dynamic level converter circuits $15b_{-1}$, $15b_{-3}$, and $15b_{-5}$ become low electric potentials. In this manner, the P-type MOS transistors $15_{-1}$, $15_{-3}$, and $15_{-5}$ whose gates are controlled by means of the outputs G1, G3, and G5 each enter an ON state. Then, the electric potentials at both ends of each of the P-type MOS transistors $15_{-1}$, $15_{-3}$, and $15_{-5}$ (between the external supply power source VDD and the node V1, between the node V2 and the node V3, and between the node V4 and the voltage increase output power source VPP) become identical to each other. At this time, the outputs G2 and G4 of the other dynamic level converter circuits $15b_{-2}$ and $15b_{-4}$ become high electric potentials. In this manner, the P-type MOS transistors $15_{-2}$ and $15_{-4}$ whose gates are controlled by means of the outputs G2 and G4 each are in an OFF state. Therefore, the electric potential of the node V1 is converged into that of the external supply power source VDD. In addition, the electric potentials of the nodes V2 and V3 are converged into the electric potential determined by redistribution of the electric charges stored in the pumping capacitors Ca2 and Ca3. In addition, the electric potentials of the node V4 and the voltage increase output power source VPP are converged into the electric potential determined by redistribution of the electric charges stored in the pumping capacitor Ca4 and a load capacity (not shown) of the voltage increase output power source VPP connected to the node V4.

On the other hand, in a period phase 2, the outputs G2 and G4 of the dynamic level converter circuits $15b_{-2}$ and $15b_{-4}$ become low electric potentials. In this manner, the P-type MOS transistors $15_{-2}$ and $15_{-4}$ whose gates are controlled by means of the outputs G2 and G4 each enter an ON state. Then, the electric potentials at both ends of each of the P-type MOS transistors $15_{-2}$ and $15_{-4}$ (between the node V1 and the node V2 and between the node V3 and the node V4) become identical to each other. At this time, the outputs G1, G3, and G5 of the other dynamic level converter circuits $15b_{-1}$, $15b_{-3}$, and $15b_{-5}$ become high electric potentials. In this manner, the P-type MOS transistors $15_{-1}$, $15_{-3}$, and $15_{-5}$ whose gates are controlled by the outputs G1, G3, and G5 each enter an OFF state. Therefore, the electric potentials of the nodes V1 and V2 are converged into the electric potential determined by redistribution of the electric charges stored in the pumping capacitors Ca1 and Ca2. In addition, the electric potentials of the nodes V3 and V4 are converged into the electric potential determined by redistribution of the electric charges stored in the pumping capacitors Ca3 and Ca4.

In this way, by repeating operations of the above periods phase 1 and phase 2, the electric charge is sequentially transferred to the voltage increase output power source VPP from the external power supply source VDD through the pumping capacitors Ca1, Ca2, Ca3, and Ca4. This is identical to a basic operation of a voltage increase function of a Dickson type charge pump.

Now, a description will be given with respect to electrical characteristics required for an internal voltage increase power source, the electrical characteristics being required to utilize a MOS transistor manufactured for a 1.2V power source as an anti-fuse element by destructing its gate oxide film. With respect to the required electrical characteristics, a voltage (voltage increase capacity) of the voltage increase output power source VPP required to write information is about 6V (volts), and the current drive capability at the time of output of 5V is about 2 mA (milliamperes) (in the case of the latest 90 nm (nanometers) technology (design rule) generation). In the case of a Dickson type charge pump (15) shown in the first embodiment, a voltage increase output electric potential VPP on the order of 6V can be obtained by supplying an external supply power source VDD of 2.5V. In addition, assuming that the capacitance of each of the pumping capacitors Ca1, Ca2, ca3, and Ca4 is 4 pF (pico-Farads) and that a frequency of a clock signal Φ is 400 MHz (mega-hertz), the current drive capability on the order of 2 mA can be obtained at the time of output of 5V. At this time, the resistance values of the resistor elements R1, R2, R3, R4, and R5 that configure the dynamic level converter circuits $15b_{-1}$, $15b_{-2}$, $15b_{-3}$, $15b_{-4}$, and $15b_{-5}$, respectively, are properly on the order of 15 KΩ (kilo-ohms) and the capacitance values of the auxiliary pumping capacitors Cb1, Cb2, Cb3, Cb4, and Cb5 are properly on the order of 1 pF, respectively.

As described above, it is preferable that the Dickson type charge pump shown in the first embodiment (refer to FIG. 2) be used as an internal voltage increase power source (voltage increase charge pump 15) of an irreversible nonvolatile semiconductor memory device using a gate oxide film destruction type anti-fuse element.

In addition, in the first embodiment, a source-drain voltage and a source-gate voltage applied to all of the transistors configuring the Dickson type charge pump are equal to or smaller than the external supply power source VDD. Therefore, if the external supply power source VDD is 2.5V, element reliability can be fully obtained by using general transistors configuring an input/output buffer. Namely, according to the first embodiment, the Dickson type charge pump can be configured without any need for a specific element (for example, high withstand voltage MOS transistor) or a specific manufacturing process. Therefore, an irreversible nonvolatile semiconductor memory device using a gate oxide film destruction type anti-fuse element (refer to FIG. 1) can be inexpensively provided.

Now, a description will be given in more detail with respect to a contrivance for improving a current drive capability or the like in a Dickson type charge pump (15) using a P-type MOS transistor as a current rectifier element.

Figure 4:
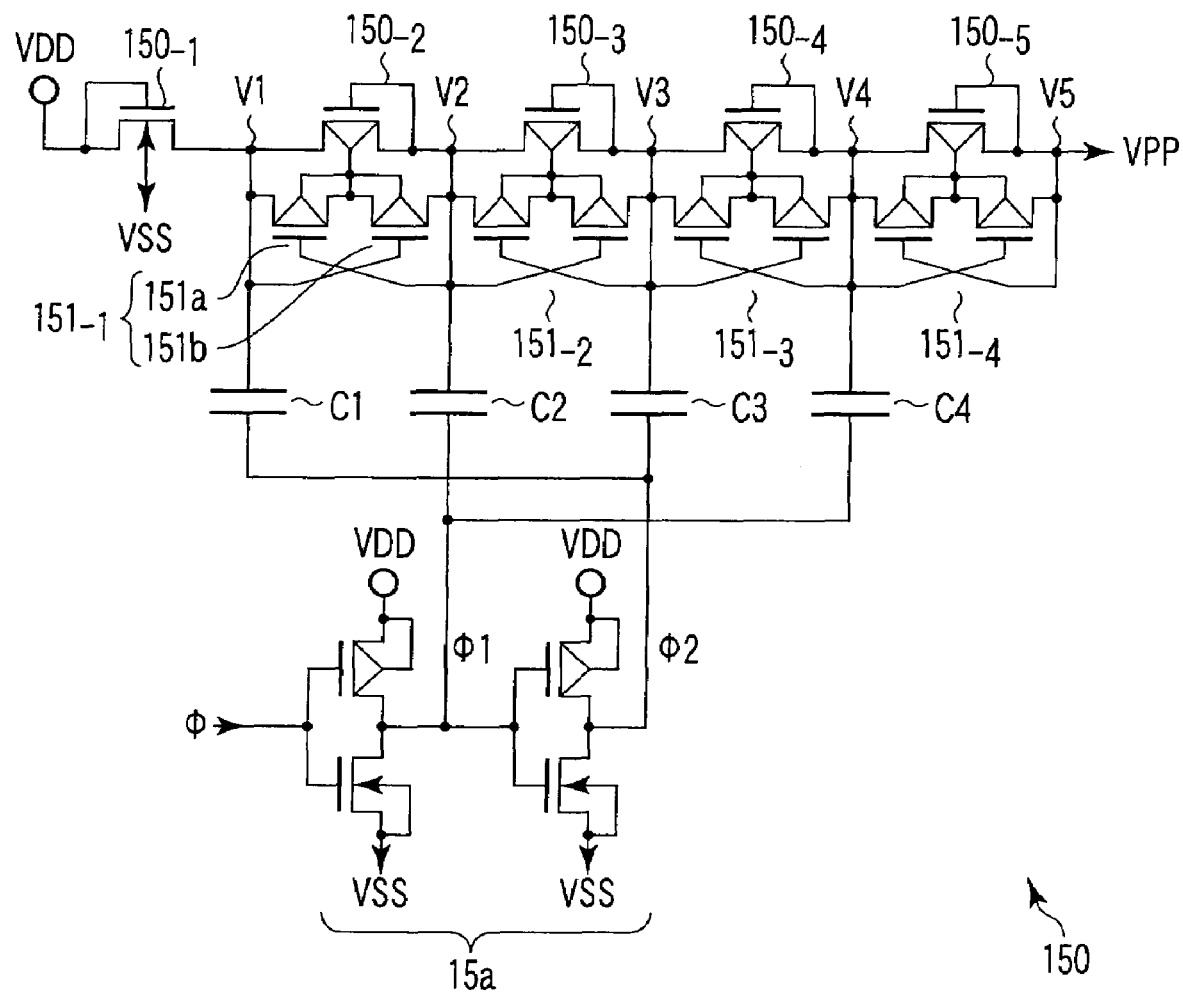
FIG. 4 is a circuit diagram depicting another example of a configuration of a Dickson type charge pump for comparison with the Dickson type charge pump shown in FIG. 2.

FIG. 4 shows another example of a configuration of a Dickson type charge pump. This Dickson type charge pump is shown for the purpose of comparison with the Dickson type charge pump in accordance with the first embodiment of the present invention shown in FIG. 2, with respect to enhancement (improvement) of the current drive capability in the case where a P-type MOS transistor is used as a current rectifier element.

That is, this Dickson type charge pump 150 is configured so that one diode-connected N-type MOS transistor $150_{-1}$ and four diode-connected P-type MOS transistors $150_{-2}$, $150_{-3}$, $150_{-4}$, and $150_{-5}$ are connected in series. One electrodes of the pumping capacitors C1, C2, C3, and C4 are connected to the nodes V1, V2, V3, and V4 of the N-type transistor $150_{-1}$ and the P-type MOS transistors $150_{-2}$, $150_{-3}$, $150_{-4}$, and $150_{-5}$, respectively. The first or second clock signal Φ1 or Φ2 from the clock signal generating circuit 15a is alternately supplied to the other electrode of each of the pumping capacitors C1, C2, C3, and C4.

In addition, a power source VSS at a low electric potential side is supplied to a back gate of the above N-type MOS transistor $150_{-1}$. Back gate bias circuits $151_{-1}$, $151_{-2}$, $151_{-3}$, and $151_{-4}$ are connected to back gates of the P-type MOS transistors $150_{-2}$, $150_{-3}$, $150_{-4}$, and $150_{-5}$, respectively. The back gate bias circuits $151_{-1}$, $151_{-2}$, $151_{-3}$, and $151_{-4}$ each bias an N-well (not shown) that is a back gate of each of the P-type MOS transistors $150_{-2}$, $150_{-3}$, $150_{-4}$, and $150_{-5}$ at an intermediate electric potential of a back gate voltage in the case where the above P-type MOS transistors $150_{-2}$, $150_{-3}$, $150_{-4}$, and $150_{-5}$ are formed on a P-type substrate (not shown). The back gate bias circuits $151_{-1}$, $151_{-2}$, $151_{-3}$, and $151_{-4}$ are configured such that two P-type MOS transistors 151a and 151b are connected in series between each of the nodes V1, V2, V3, V4 and the node V5 between the P-type MOS transistor $150_{-5}$ and the voltage increase output power source VPP.

In the case where such a configuration is provided, the back gates of the P-type MOS transistors $150_{-2}$, $150_{-3}$, $150_{-4}$, and $150_{-5}$ can be biased at an intermediate electric potential of a back gate voltage by means of the back gate bias circuits $151_{-1}$, $151_{-2}$, $151_{-3}$, and $151_{-4}$. Therefore, the influence of a back gate effect generated by the N-type MOS transistor, as described previously, can be avoided.

However, the current drive capability of the P-type MOS transistor is low, i.e., equal to or smaller than ½ as compared with the current drive capability of the N-type MOS transistor. Namely, the current drive capability of the Dickson type charge pump using the P-type MOS transistor is remarkably low. In the case where an attempt is made to obtain the current drive capability equal to that of the Dickson type charge pump using the N-type MOS transistor, it is necessary to increase an element size and to have a chip area of at least twice as large as usual. Moreover, a parasitic capacitance increases as the element size increases, and a charge/discharge current relevant to its parasitic capacitance increases. Therefore, the voltage increase capability of the Dickson type charge pump is extremely lowered. In this way, the voltage increase capability and the current drive capability become insufficient in the Dickson type charge pump configured by diode-connecting the P-type MOS transistors. Therefore, an irreversible nonvolatile semiconductor memory device using a gate oxide film destruction type anti-fuse element cannot be provided.

In contrast, in the case of the Dickson type charge pump (15) in accordance with the first embodiment of the present invention shown in FIG. 2, the intermediate electric potentials (gate signals G1, G2, G3, G4, and G5) of the gate voltages for controlling gates of the P-type MOS transistors $15_{-1}$, $15_{-2}$, $15_{-3}$, $15_{-4}$, and $15_{-5}$ are generated by means of the dynamic level converter circuits $15b_{-1}$, $15b_{-2}$, $15b_{-3}$, $15b_{-4}$, and $15b_{-5}$. In this manner, even in the Dickson type charge pump using the P-type MOS transistor, it becomes possible to improve the current drive capability without any need for a specific element (for example, high withstand voltage MOS transistor) or a specific manufacturing process. Therefore, an irreversible nonvolatile semiconductor memory device using a gate oxide film destruction type anti-fuse element can be easily provided.

Figure 5:
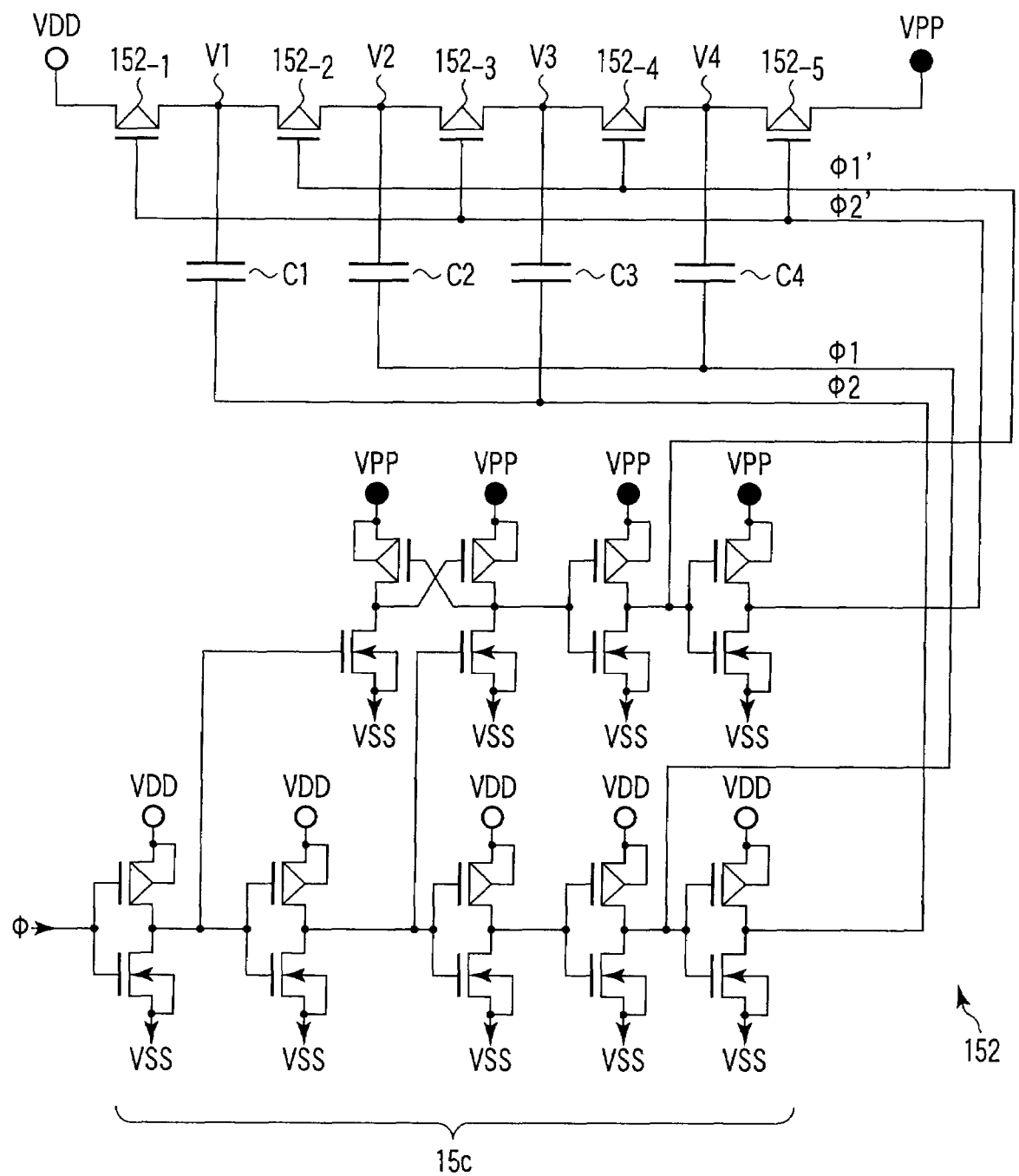
FIG. 5 is a circuit diagram depicting still another example of a configuration of a Dickson type charge pump for comparison with the Dickson type charge pump shown in FIG. 2.

FIG. 5 shows further another example of a configuration of a Dickson type charge pump. This Dickson type charge pump is shown for the purpose of comparison with the Dickson type charge pump in accordance with the first embodiment of the present invention shown in FIG. 2. The present example describes a case in which a contrivance for improving a current drive capability has been made in a Dickson type charge pump configured using a P-type MOS transistor.

In the contrivance for improving the current drive capability, gates of five P-type MOS transistors $152_{-1}$, $152_{-2}$, $152_{-3}$, $152_{-4}$, and $152_{-5}$ connected in series are controlled by means of rectangular wave clock signals Φ1' and Φ2' that are VSS on the low electric potential side and are VPP at the high electric potential side, alternately, whereby a reliable cutoff state and a sufficient ON current can be obtained. The clock signals Φ1' and Φ2' are synchronized with the clock signals Φ1 and Φ2 for driving the pumping capacitors C1, C2, C3, and C4. For example, these clock signals are generated by means of a clock signal generating circuit 15c.

In the case where such a configuration is provided, in this Dickson type charge pump 152, gate withstand voltages of the P-type MOS transistors $152_{-1}$, $152_{-2}$, $152_{-3}$, $152_{-4}$, and $152_{-5}$ become a problem. That is, the gates of the P-type MOS transistors $152_{-1}$, $152_{-2}$, $152_{-3}$, $152_{-4}$, and $152_{-5}$ are controlled by means of the clock signals Φ1' and Φ2' that are VSS at the low electric potential side. Therefore, in particular, a voltage increase output power source VPP that is a high electric potential is applied as it is to the P-type MOS transistor $152_{-5}$ at a final stage. In the case of an irreversible nonvolatile semiconductor memory device using a gate oxide film destruction type anti-fuse element, the voltage increase output power source VPP is such a high voltage that the gate oxide films of the P-type MOS transistors $152_{-1}$, $152_{-2}$, $152_{-3}$, $152_{-4}$, and $152_{-5}$ can be destructed within a short time. Therefore, in the irreversible nonvolatile semiconductor memory device using the gate oxide film destruction type anti-fuse element, a high withstand voltage MOS transistor is required in order for this Dickson type charge pump 152 to be applicable. In this case, the irreversible nonvolatile semiconductor memory device using the gate oxide film destruction type anti-fuse element cannot be inexpensively provided.

In contrast, in the case of the Dickson type charge pump (15) in accordance with the first embodiment of the present invention shown in FIG. 2, the intermediate electric potentials (gate signals G1, G2, G3, G4, and G5) of the gate voltages for controlling gates of the P-type MOS transistors $15_{-1}$, $15_{-2}$, $15_{-3}$, $15_{-4}$, and $15_{-5}$ are generated by means of the dynamic level converter circuits $15b_{-1}$, $15b_{-2}$, $15b_{-3}$, $15b_{-4}$, and $15b_{-5}$. In this manner, even in the Dickson type charge pump using the P-type MOS transistor, it becomes possible to improve the current drive capability without any need for a specific element (for example, high withstand voltage MOS transistor) or a specific manufacturing process. Therefore, the irreversible nonvolatile semiconductor memory device using the gate oxide film destruction type anti-fuse element can be inexpensively provided.

In the case of the Dickson type charge pump (15) in accordance with the first embodiment described above, it is possible to configure the pumping capacitors Ca1, Ca2, Ca3, and Ca4 and the auxiliary pumping capacitors Cb1, Cb2, Cb3, Cb4, and Cb5 so as to be driven by means of the clock signals Φ1' and Φ2' synchronized with the clock signals Φ1 and Φ2.

Figure 6:
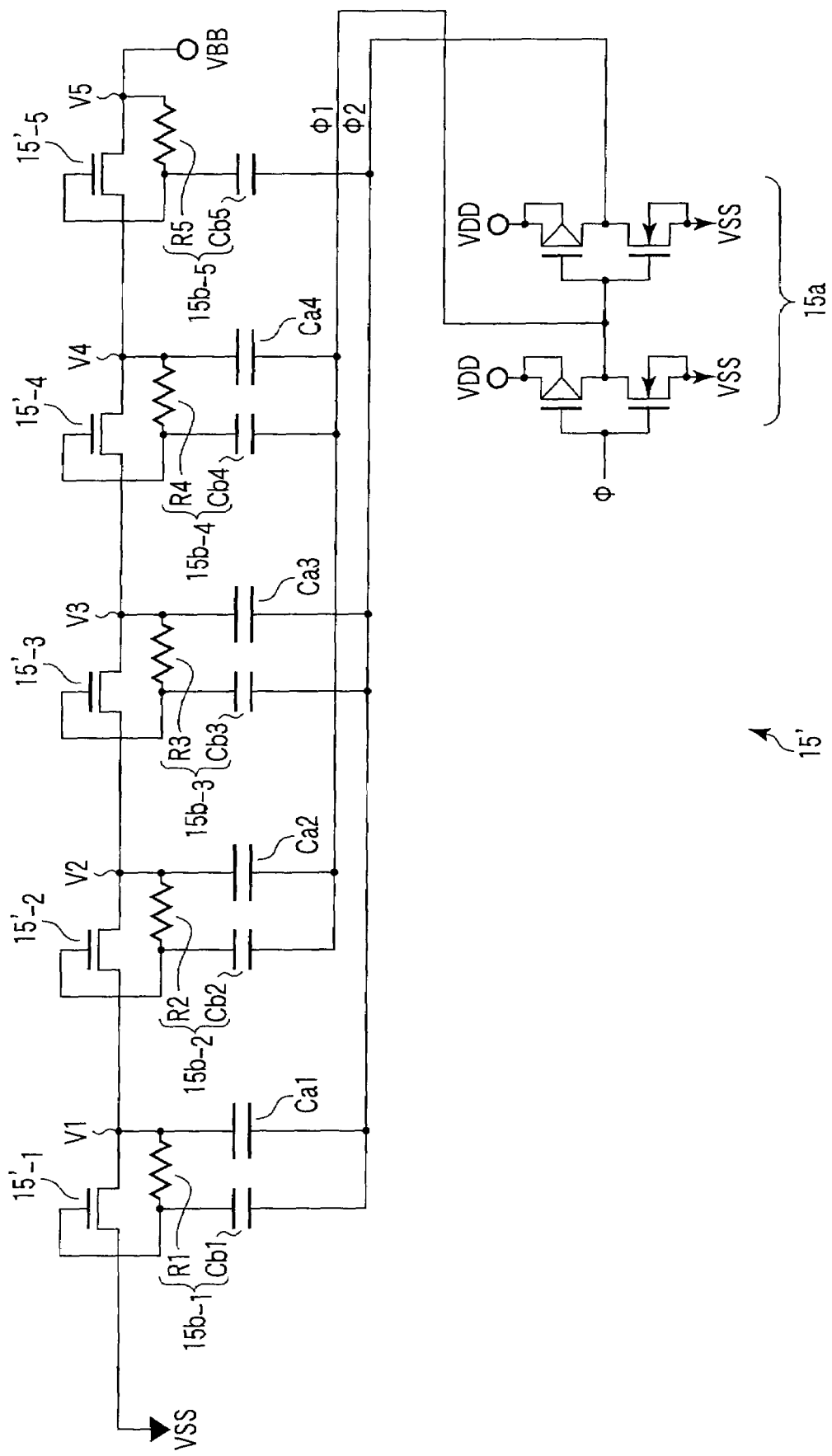
FIG. 6 is a circuit diagram depicting an example in which the Dickson type charge pump shown in FIG. 2 is configured as a negative charge pump.

In addition, without being limited to the P-type MOS transistor, for example, as shown in FIG. 6, it is possible to configure a negative voltage increase charge pump (Dickson type charge pump) 15' for generating a negative voltage increase output power source (electric potential) VBB by connecting the N-type MOS transistors $15'_{-1}$, $15'_{-2}$, $15'_{-3}$, $15'_{-4}$, and $15'_{-5}$ in series. In the case of this negative voltage increase charge pump 15' as well, it is possible to configure the pumping capacitors Ca1, Ca2, Ca3, and Ca4 and the auxiliary pumping capacitors Cb1, Cb2, Cb3, Cb4, and Cb5 so as to be driven by means of the clock signals Φ1' and Φ2' synchronized with the clock signals Φ1 and Φ2.

In any configuration, it is possible to use N-type MOS transistors or P-type MOS transistors in place of the resistor elements R1, R2, R3, R4, and R5.

Second Embodiment

Figure 7:
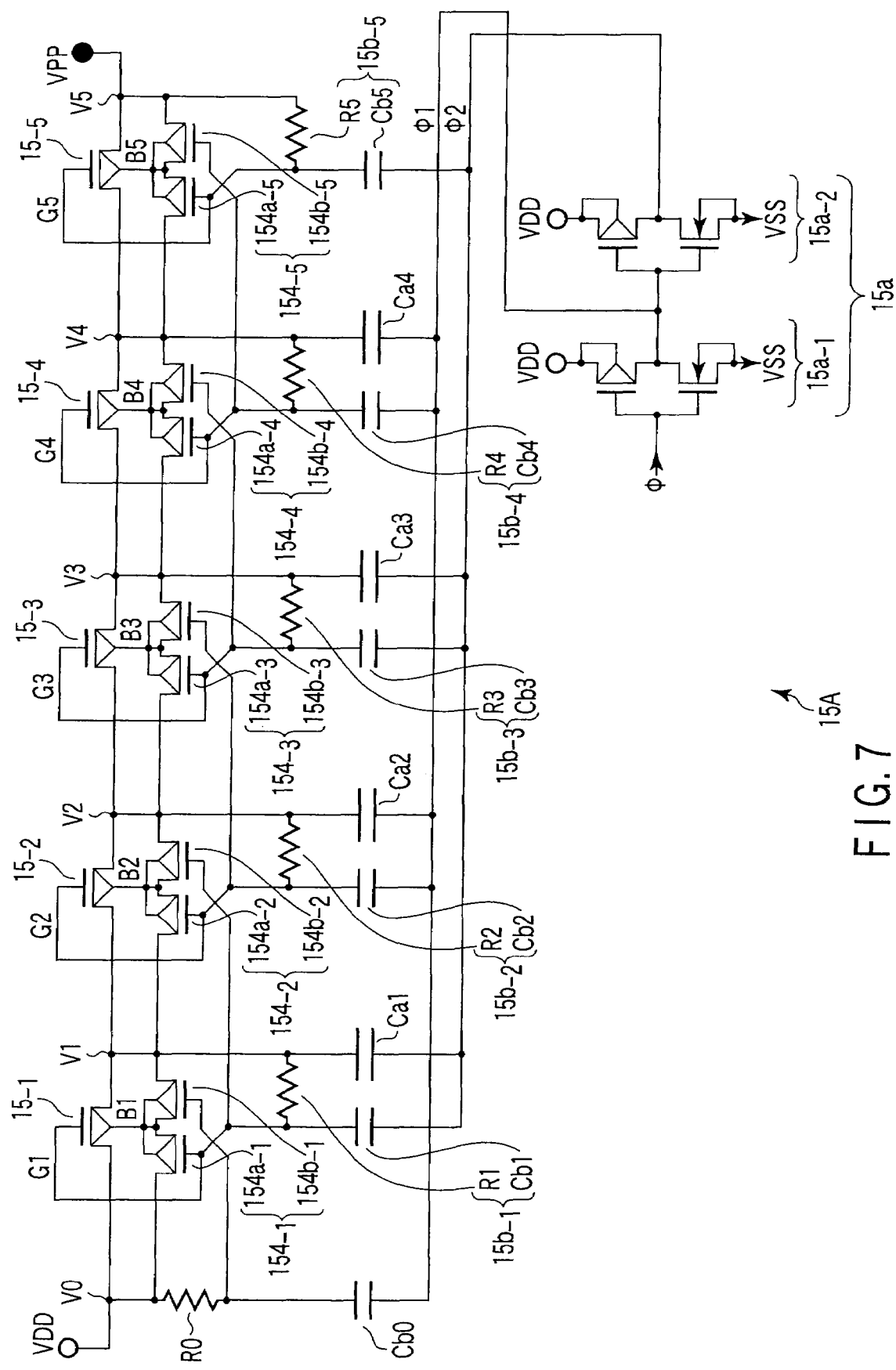
FIG. 7 is a circuit diagram depicting an example of a configuration of a Dickson type charge pump (voltage increase charge pump) suitable for use in the irreversible nonvolatile semiconductor memory device according to a second embodiment of the present invention.

FIG. 7 shows an example of a configuration of a Dickson type charge pump in accordance with a second embodiment of the present invention. The present embodiment also describes a Dickson type charge pump suitable for use as a voltage increase charge pump in an irreversible nonvolatile semiconductor memory device using a gate oxide film destruction type anti-fuse element. In addition, the present embodiment describes an example of a Dickson type charge pump having a five-stage structure in which five P-type MOS transistors serving as current rectifier elements are connected in series. Like constituent elements of the Dickson type charge pump shown in FIG. 2 are designated by like reference numerals. A detailed description thereof is omitted here.

This Dickson type charge pump 15A is provided as an example in which back gate bias circuits $154_{-1}$, $154_{-2}$, $154_{-3}$, $154_{-4}$, and $154_{-5}$ have been added to the Dickson type charge pump having the configuration shown in FIG. 2, for providing an electric potential to an N-well that is a back gate of each of P-type MOS transistors $15_{-1}$, $15_{-2}$, $15_{-3}$, $15_{-4}$, and $15_{-5}$. In the case of the present embodiment, one electrode of an auxiliary pumping capacitor Cb0 is connected via a resistor element R0 to a node V0 between an external supply power source VDD and the P-type MOS transistor $15_{-1}$. A first clock signal Φ1 from a first clock signal generator unit $15a_{-1}$ is applied to the other electrode of this auxiliary pumping capacitor Cb0.

The back gate bias circuits $154_{-1}$, $154_{-2}$, $154_{-3}$, $154_{-4}$, and $154_{-5}$ are composed of two serially connected P-type MOS transistors $154a_{-1}$ and $154b_{-1}$, $154a_{-2}$ and $154b_{-2}$, $154a_{-3}$ and $154b_{-3}$, $154a_{-4}$ and $154b_{-4}$, and $154a_{-5}$ and $154b_{-5}$, respectively. One P-type MOS transistors $154a_{-1}$, $154a_{-2}$, $154a_{-3}$, $154a_{-4}$, and $154a_{-5}$ connect between each of nodes V0, V1, V2, V3, and V4 of the source side of the P-type MOS transistors $15_{-1}$, $15_{-2}$, $15_{-3}$, $15_{-4}$, and $15_{-5}$ and each of back gates B1, B2, B3, B4, and B5. The other P-type MOS transistors $154b_{-1}$, $154b_{-2}$, $154b_{-3}$, $154b_{-4}$, and $154b_{-5}$ connect between each of nodes V1, V2, V3, V4, and V5 of the drain side of the P-type MOS transistors $15_{-1}$, $15_{-2}$, $15_{-3}$, $15_{-4}$, and $15_{-5}$ and each of the back gates B1, B2, B3, B4, and B5.

Here, with reference to the P-type MOS transistor $15_{-2}$ at the second stage, a description will be given with respect to an operation of the back gate bias circuit $154_{-2}$. First, let us consider a case in which a clock signal Φ2 is a high electric potential VDD and a clock signal Φ1 is a low electric potential VSS. At this time, the electric potential of the node V1 at the source side of the P-type MOS transistor $15_{-2}$ is higher than the electric potential of the node V2 at the drain side. In addition, in order for the P-type MOS transistor $15_{-2}$ to be electrically conductive, a gate signal G2 supplied to the gate thereof becomes a low electric potential. This gate signal G2 is also supplied to a gate of the P-type MOS transistor $154a_{-2}$ configuring the back gate bias circuit $154_{-2}$. In this manner, the P-type MOS transistor $154a_{-2}$ becomes electrically conductive. Concurrently, the electric potential of the back gate B2 becomes equal to that of the node V1 at the source side that is the highest electric potential at this time.

Next, let us consider a case in which a clock signal Φ1 is a high electric potential VDD and a clock signal Φ2 is a low electric potential VSS. At this time, the electric potential of the node V2 at the drain side of the P-type MOS transistor $15_{-2}$ is higher than the electric potential of the node V1 at the source side. In addition, in order for the P-type MOS transistor $15_{-2}$ to be electrically nonconductive, a gate signal G2 supplied to the gate thereof becomes a high electric potential. This gate signal G2 is also supplied to a gate of the P-type MOS transistor $154a_{-2}$ configuring the back gate bias circuit $154_{-2}$. In this manner, the P-type MOS transistor $154a_{-2}$ becomes electrically nonconductive. At this time, in order for the previous-stage P-type MOS transistor $15_{-1}$ to be electrically conductive, the gate signal G1 thereof becomes a low voltage. This gate signal G1 is also supplied to a gate of the P-type MOS transistor $154b_{-2}$ configuring the target second-stage back gate bias circuit $154_{-2}$. In this manner, the P-type MOS transistor $154b_{-2}$ becomes electrically conductive. Concurrently, the electric potential of the back gate B2 becomes equal to that of the node V2 at the drain side that is the highest electric potential at this time.

Such an operation is repeated for the respective P-type MOS transistors $15_{-1}$, $15_{-2}$, $15_{-3}$, $15_{-4}$, and $15_{-5}$. Assuming that the P-type MOS transistors $15_{-1}$, $15_{-2}$, $15_{-3}$, $15_{-4}$, and $15_{-5}$ are formed on a P-type substrate, the electric potential of the N-well serving as the back gate thereof is always maintained at a higher electric potential that that of a P+ type diffusion region serving as a source and a drain. In this manner, the generation of a forward current of a PN junction formed of the N-well and the P+ type diffusion region can be prevented. Namely, there are attained an advantageous effect of preventing the generation of a leak current onto a substrate due to an operation of a parasitic bipolar and an advantageous effect of preventing a danger of latch-up.

In addition, it is possible to prevent the respective N-wells from becoming a higher electric potential than necessary. This causes an advantageous effect of preventing a phenomenon that threshold voltages of the P-type MOS transistors $15_{-1}$, $15_{-2}$, $15_{-3}$, $15_{-4}$, and $15_{-5}$ increase, and then, an ON current decreases. Namely, according to the Dickson type charge pump 15A of the present embodiment, there can be provided an internal voltage increase power source (voltage increase charge pump 15) that has a high current supply capability and that operates stably. Therefore, even with the Dickson type charge pump 15A using a P-type MOS transistor for a current rectifier element, it is possible to inexpensively provide an irreversible nonvolatile semiconductor memory device using a gate oxide film destruction type anti-fuse element without any need for a specific element (for example, high withstand voltage MOS transistor) or a specific manufacturing process.

In the case of this Dickson type charge pump 15A as well, it is possible to configure pumping capacitors Ca1, Ca2, Ca3, and Ca4 and auxiliary pumping capacitors Cb0, Cb1, Cb3, Cb4, and Cb5 so as to be driven by means of clock signals Φ1' and Φ2' synchronized with clock signals Φ1 and Φ2.

In addition, it is possible to configure a negative Dickson type charge pump using an N-type MOS transistor.

In addition, in any configuration, it is possible to use N-type MOS transistors or P-type transistors in place of resistor elements R1, R2, R3, R4, and R5.

Third Embodiment

Figure 8:
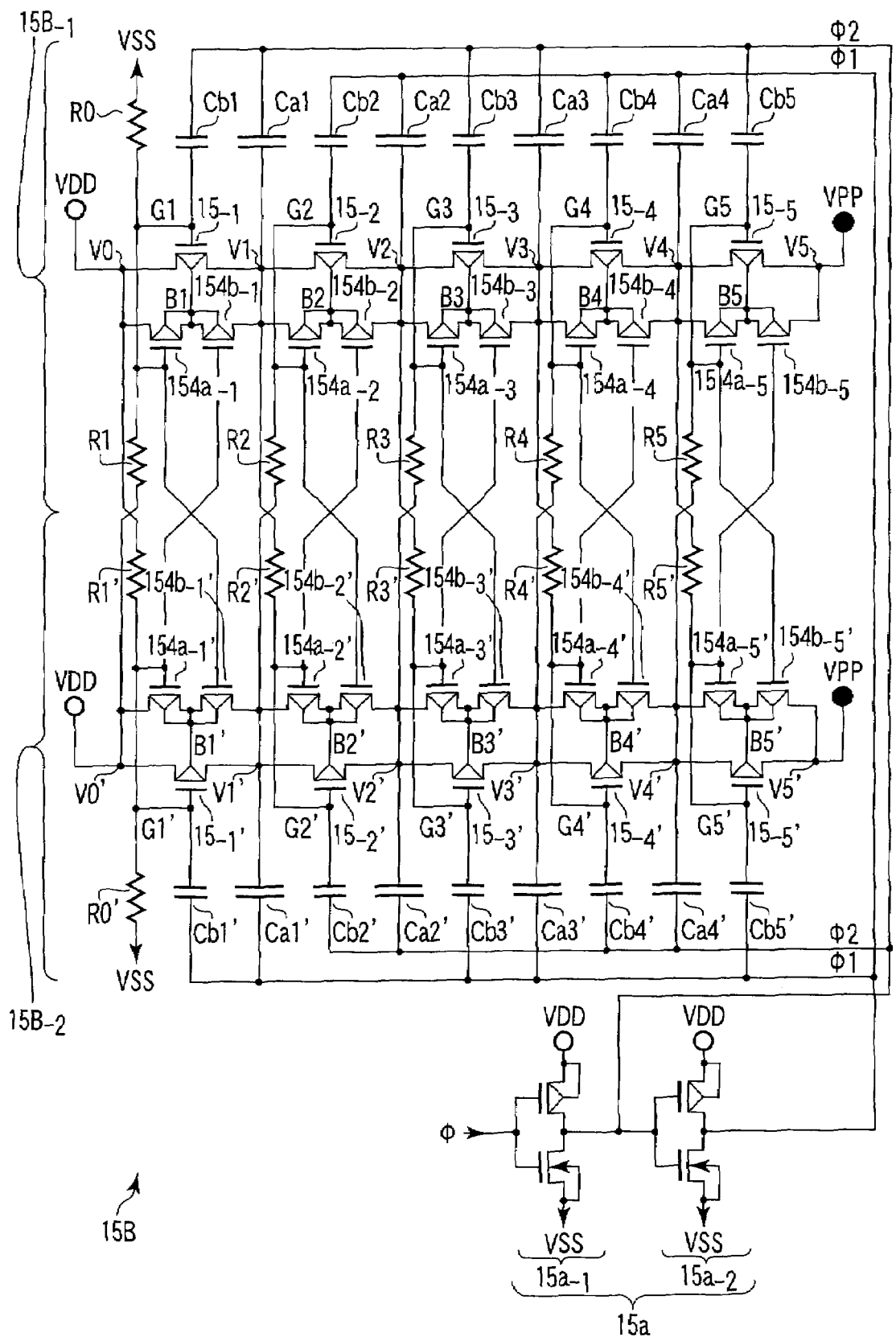
FIG. 8 is a circuit diagram depicting an example of a configuration of a charge pump (voltage increase charge pump) suitable for use in the irreversible nonvolatile semiconductor memory device according to a third embodiment of the present invention.
Figure 9:
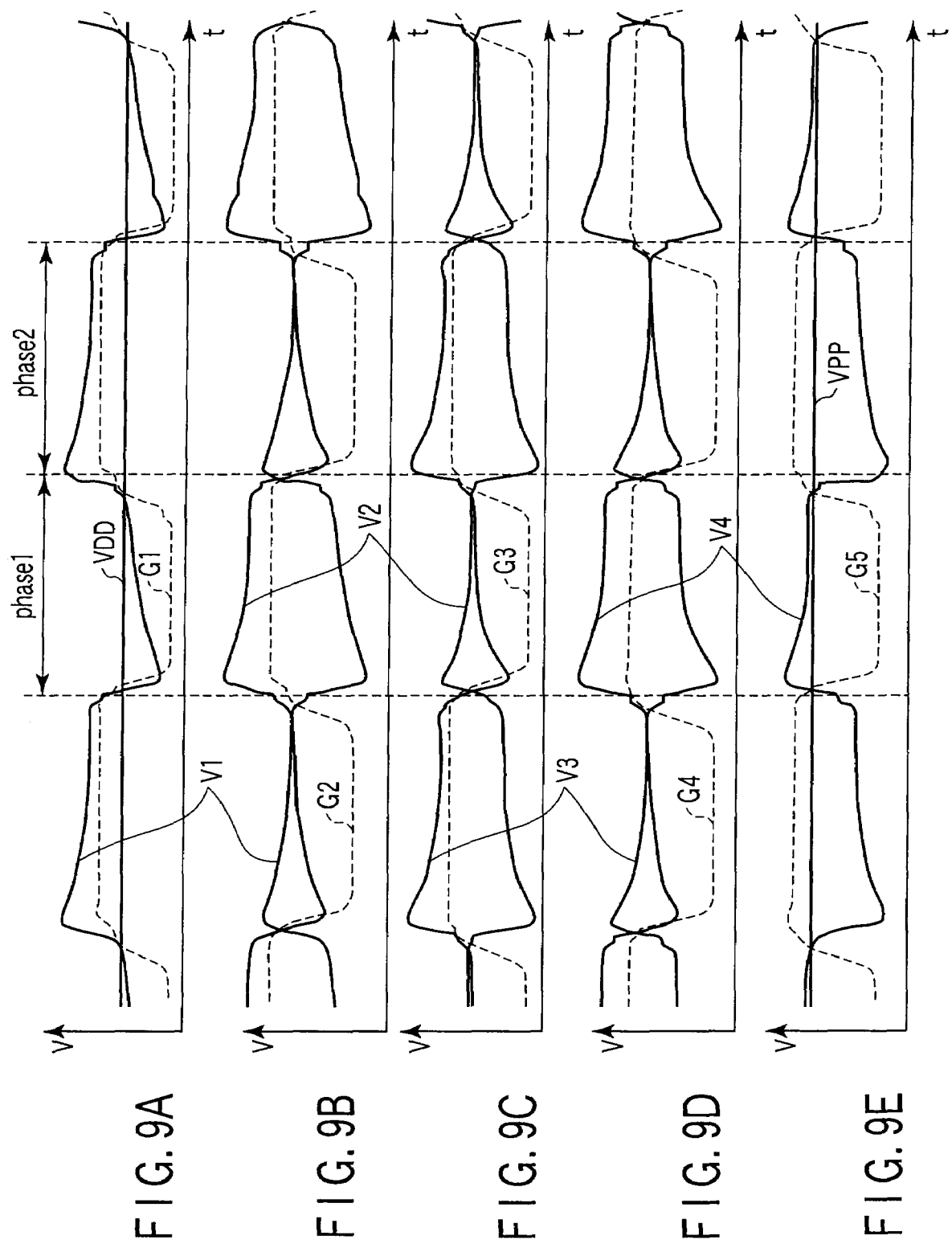
FIGS. 9A to 9E are waveform diagrams each adapted to explain an operation of the charge pump shown in FIG. 8.

FIG. 8 shows an example of a configuration of a charge pump in accordance with a third embodiment of the present invention. The present embodiment describes a charge pump suitable for use as a voltage increase charge pump in an irreversible nonvolatile semiconductor memory device using a gate oxide film destruction type anti-fuse element. In addition, the present embodiment describes an example in which a Dickson type charge pump having a five-stage structure in which five P-type MOS transistors serving as current rectifier elements are connected in series is prepared in two systems, and gate signals of the P-type MOS transistors in the respective systems are cross-coupled with each other. Like constituent elements of the Dickson type charge pump shown in FIG. 7 are designated by like reference numerals. A detailed description thereof is omitted here.

For example, this charge pump 15B includes: a Dickson type charge pump $15B_{-1}$ of a first system and a Dickson type charge pump $15B_{-2}$ of a second system having a substantially similar configuration to that of the first system. In addition, this charge pump 15B reversibly supplies first and second clock signals $\Phi 1$ and $\Phi 2$ for driving a pumping capacitor in each one of the systems ($15B_{-1}$ and $15B_{-2}$). That is, in the Dickson type charge pump $15B_{-1}$ of the first system, the first clock signal $\Phi 1$ is supplied to pumping capacitors Ca2 and Ca4 and auxiliary pumping capacitors Cb2 and Cb4, respectively. In addition, the second signal $\Phi 2$ is supplied to pumping capacitors Ca1 and Ca3 and auxiliary pumping capacitors Cb1, Cb3 and Cb5, respectively. On the other hand, in the Dickson type charge pump $15B_{-2}$ of the second system, the first clock signal $\Phi 1$ is supplied to pumping capacitors Ca1' and Ca3' and auxiliary pumping capacitors Cb1', Cb3', and Cb5', respectively. In addition, the second clock signal $\Phi 2$ is supplied to pumping capacitors Ca2' and Ca4' and auxiliary pumping capacitors Cb2' and Cb4', respectively.

In addition, a configuration of a dynamic level converter circuit is also different from that of the Dickson type charge pump 15A shown in the second embodiment. That is, in the Dickson type charge pump $15B_{-1}$ of the first system, one end of each of resistor elements R1, R2, R3, R4, and R5 configuring the dynamic level converter circuits (corresponding to $15b_{-1}$, $15b_{-2}$, $15b_{-3}$, $15b_{-4}$, and $15b_{-5}$ of FIG. 7) is connected to each of nodes V0', V1', V2', V3', and V4' at the source side of the P-type MOS transistors $15_{-1}'$, $15_{-2}'$, $15_{-3}'$, $15_{-4}'$, and $15_{-5}'$ in the Dickson type charge pump $15B_{-2}$ of the second system. On the other hand, in the Dickson type charge pump $15B_{-2}$ of the second system, one end of each of resistor elements R1', R2', R3', R4', and R5' configuring the dynamic level converter circuit is connected to each of nodes V0, V1, V2, V3, and V4 at the source side of the P-type MOS transistors $15_{-1}$, $15_{-2}$, $15_{-3}$, $15_{-4}$, and $15_{-5}$.

In addition, in the Dickson type charge pump $15B_{-1}$ of the first system, a resistor element R0 is connected between a gate of the P-type MOS transistor $15_{-1}$ and a power source VSS at the low electric potential side. Similarly, in the Dickson type charge pump $15B_{-2}$ of the second system, a resistor element R0' is connected between a gate of the P-type MOS transistor $15_{-1}'$ and a power source VSS at the low electric potential side.

FIGS. 9A to 9E each show an operating waveform of a charge pump 15B having the configuration described above. Here, FIGS. 9A to 9E each show a relationship among outputs (gate signals) G1, G2, G3, G4, and G5 of dynamic level converter circuits of the Dickson type charge pump $15B_{-1}$ of the first system; electric potentials of nodes V1, V2, V3, and V4 of the P-type MOS transistors $15_{-1}$, $15_{-2}$, $15_{-3}$, $15_{-4}$, and $15_{-5}$; and an external supply power source VDD and a voltage increase output power source VPP. Each horizontal axis denotes a time (t) and each vertical axis denotes an electric potential (V).

As is evident from FIGS. 9A to 9E, in the case of the third embodiment, it is found that the electric potentials of the gate signals G1, G2, G3, G4, and G5 indicated by the dashed line are wholly lowered as compared with the operating waveforms in the case of the first embodiment described above (refer to FIGS. 3A to 3E). This is because, in the first and second embodiments, one end of each of the resistor elements R1, R2, R3, R4, and R5 configuring the dynamic level converter circuits $15b_{-1}$, $15b_{-2}$, $15b_{-3}$, $15b_{-4}$, and $15b_{-5}$ is connected to each of nodes V1, V2, V3, V4, and V5 at the drain side of the P-type MOS transistors $15_{-1}$, $15_{-2}$, $15_{-3}$, $15_{-4}$, and $15_{-5}$, respectively, while in the third embodiment, one end of each of the resistor elements R1, R2, R3, R4, and R5 and R1', R2', R3', R4', and R5' is connected to each of nodes V0, V1, V2, V3, and V4 and V0', V1', V2', V3', and V4' at the source side of the P-type MOS transistors $15_{-1}$, $15_{-2}$, $15_{-3}$, $15_{-4}$, and $15_{-5}$ and $15_{-1}'$, $15_{-2}'$, $15_{-3}'$, $15_{-4}'$, and $15_{-5}'$.

In addition, in the dynamic level converter circuit at the first stage, resistor elements R0 and R0' are added between a gate of each of the P-type MOS transistors $15_{-1}$ and $15_{-1}'$ and the power source VSS at the low electric potential side. In this manner, an average electric potential of the gate signals G1 and G1' at the first stage is set to be lower than the power source VDD at the high electric potential side. Namely, the electric potentials of gate signals G1, G2, G3, G4, and G5 and G1', G2', G3', G4', and G5' can be set to be lower, whereby the current drive capabilities of the P-type MOS transistors $15_{-1}$, $15_{-2}$, $15_{-3}$, $15_{-4}$, and $15_{-5}$ and $15_{-1}'$, $15_{-2}'$, $15_{-3}'$, $15_{-4}'$, and $15_{-5}'$ can be enhanced.

In this way, according to the third embodiment described above, a charge pump 15B having a high current drive capability can be achieved. Therefore, this charge pump 15B is applied as a voltage increase charge pump 15, thereby enabling high performance of an irreversible nonvolatile semiconductor memory device using a gate oxide film destruction type anti-fuse element.

In the case of this charge pump 15B, it is possible to configure pumping capacitors Ca1, Ca2, Ca3, and Ca4 and Ca1', Ca2', Ca3', and Ca4' and auxiliary pumping capacitors Cb1, Cb2, Cb3, Cb4, and Cb5 and Cb1', Cb2', Cb3', Cb4', and Cb5' so as to be driven by means of clock signals $\Phi 1'$ and $\Phi 2'$ synchronized with the clock signals $\Phi 1$ and $\Phi 2$.

In addition, it is also possible to configure a negative charge pump using an N-type MOS transistor.

Fourth Embodiment

FIG. 10 shows an example of a configuration of a charge pump in accordance with a fourth embodiment of the present invention. The present embodiment describes a charge pump suitable for use as a voltage increase charge pump in an irreversible nonvolatile semiconductor memory device using a gate oxide film destruction type anti-fuse element. In addition, the present embodiment describes an example in which a Dickson type charge pump having a five-stage structure in which five P-type MOS transistors serving as current rectifier elements are connected in series is prepared in two systems, and gate signals of the P-type MOS transistors in the respective systems are cross-coupled with each other. Like constituent elements of the Dickson type charge pump shown in FIG.

8 are designated by like reference numerals. A detailed description thereof is omitted here.

In the fourth embodiment, each of the resistor elements of the charge pump in the third embodiment described above is replaced by an N-type MOS transistor. That is, in this charge pump 15C, the dynamic level converter circuits in a Dickson type charge pump $15C_{-1}$ of a first system (corresponding to $15b_{-1}$, $15b_{-2}$, $15b_{-3}$, $15b_{-4}$, and $15b_{-5}$ of FIG. 7) are configured of: resistor units Ra1, Ra2, Ra3, Ra4, and Ra5 each consisting of three N-type MOS transistors NMa, NMb, and NMc; and auxiliary pumping capacitors Cb1, Cb2, Cb3, Cb4, and Cb5. Similarly, the dynamic level converter circuits in a Dickson type charge pump $15C_{-2}$ of a second system (corresponding to $15b_{-1}$, $15b_{-2}$, $15b_{-3}$, $15b_{-4}$, and $15b_{-5}$ of FIG. 7) are configured of: resistor units Ra1', Ra2', Ra3', Ra4', and Ra5' each consisting of three N-type MOS transistors NMa', NMb', and NMc'; and auxiliary pumping capacitors Cb1', Cb2', Cb3', Cb4', and Cb5'.

In addition, in the dynamic level converter circuit of the first stage, resistor units NM0 and NM0' each consisting of an N-type MOS transistor are connected between a gate of each of the P-type MOS transistors $15_{-1}$ and $15_{-1}'$ and the power source VSS at the low electric potential side, respectively.

The dynamic level converter circuits in the Dickson type charge pump $15C_{-1}$ of the first system each branch a slight electric charge from each of the nodes V0, V1, V2, V3, and V4 at the source side of the P-type MOS transistors $15_{-1}$, $15_{-2}$, $15_{-3}$, $15_{-4}$, and $15_{-5}$, respectively, and stores the branched electric charge in the auxiliary pumping capacitors Cb1, Cb2, Cb3, Cb4, and Cb5. In this manner, an average electric potential of the gate signals G1, G2, G3, G4, and G5 is compensated for, namely, is set at an optimal value. Similarly, the dynamic level converter circuits in the Dickson type charge pump $15C_{-2}$ of the second system each branch a slight electric charge from each of the nodes V0', V1', V2', V3', and V4' at the source side of the P-type MOS transistors $15_{-1}'$, $15_{-2}'$, $15_{-3}'$, $15_{-4}'$, and $15_{-5}'$, respectively, and stores the branched electric charge in the auxiliary pumping capacitors Cb1', Cb2', Cb3', Cb4', and Cb5'. In this manner, an average electric potential of the gate signals G1', G2', G3', G4', and G5' is compensated for, namely, is set at an optimal value.

In the case where such a configuration is provided, electrical characteristics expected by the dynamic level converter circuits are substantially equivalent to those of resistor elements of about 15 KΩ, and characteristic degradations such as decrease of an ON current and increase of a cutoff current never cause a problem in particular. In addition, as long as gate oxide film destruction type anti-fuse elements 13a to 13d enter a high resistance conductive state at the time of an information write operation, an irreversible nonvolatile semiconductor memory device using a gate oxide film destruction type anti-fuse element may have any configuration, and thus, a variety of embodiments can be conceived.

Moreover, according to the fourth embodiment, a process for manufacturing a resistor element can be eliminated. Therefore, an irreversible nonvolatile semiconductor memory device using a gate oxide film destruction type anti-fuse element can be achieved more inexpensively.

In the case of this charge pump 15C as well, it is possible to configure pumping capacitors Ca1, Ca2, Ca3, and Ca4 and Ca1', Ca2', Ca3', and Ca4' and auxiliary pumping capacitors Cb1, Cb2, Cb3, Cb4, and Cb5 and Cb1', Cb2', Cb3', Cb4', and Cb5' so as to be driven by means of clock signals Φ1' and Φ2' synchronized with the clock signals Φ1 and Φ2.

In addition, it is also possible to configure a negative charge pump using an N-type MOS transistor.

Fifth Embodiment

Figure 11:
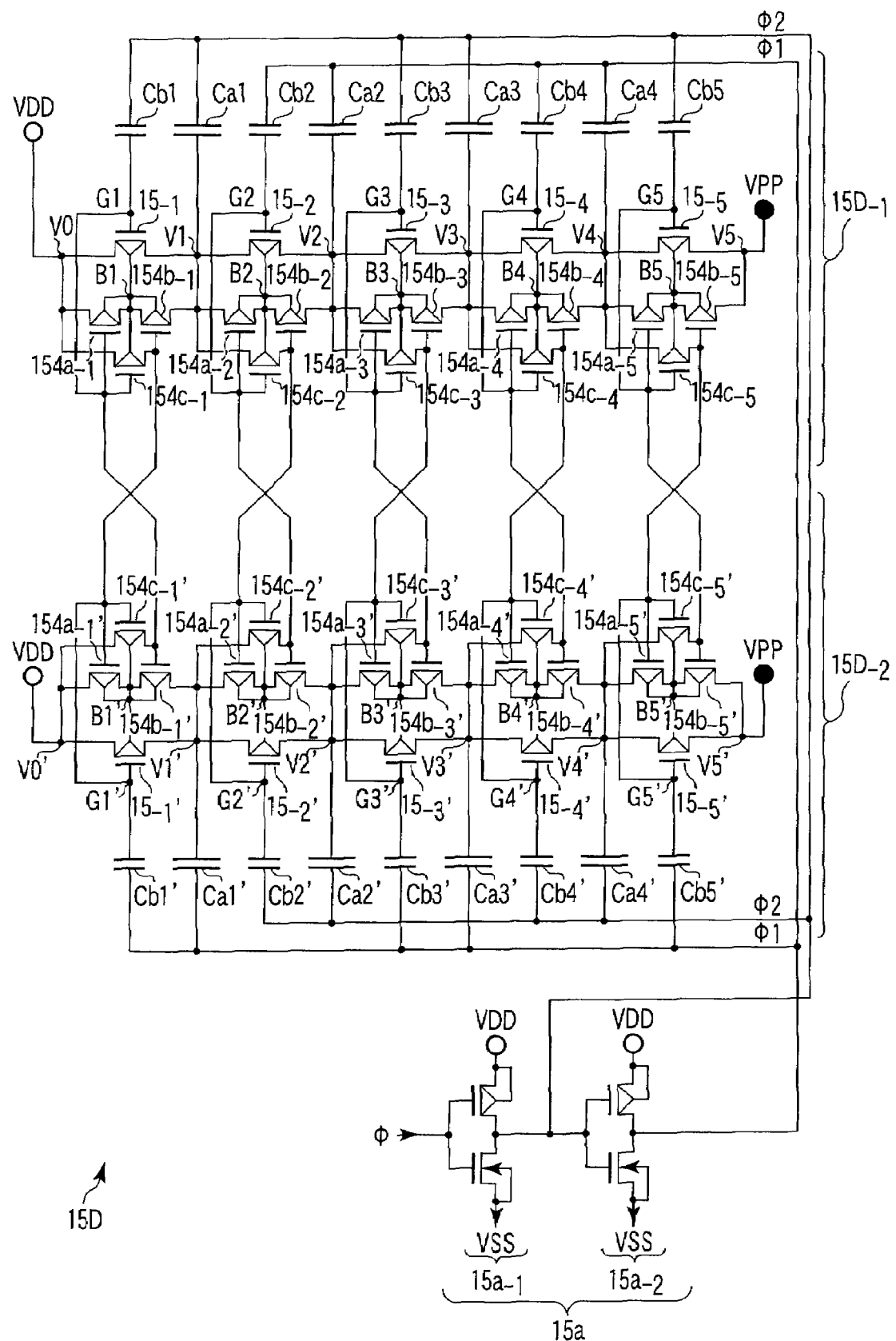
FIG. 11 is a circuit diagram depicting an example of a configuration of a charge pump (voltage increase charge pump) suitable for use in the irreversible nonvolatile semiconductor memory device according to a fifth embodiment of the present invention.

FIG. 11 shows an example of a configuration of a charge pump in accordance with a fifth embodiment of the present invention. The present embodiment describes a charge pump suitable for use as a voltage increase charge pump in an irreversible nonvolatile semiconductor memory device using a gate oxide film destruction type anti-fuse element. In addition, the present embodiment describes an example in which a Dickson type charge pump having a five-stage structure in which five P-type MOS transistors serving as current rectifier elements are connected in series is prepared in two systems, and gate signals of the P-type MOS transistors in the respective systems are cross-coupled with each other. Like constituent elements of the charge pump shown in FIG. 8 are designated by like reference numerals. A detailed description thereof is omitted here.

In the fifth embodiment, each of the resistor elements of the charge pump in the third embodiment described above is replaced by a P-type MOS transistor. That is, in this charge pump 15D, the dynamic level converter circuits in a Dickson type charge pump $15D_{-1}$ of a first system (corresponding to $15b_{-1}$, $15b_{-2}$, $15b_{-3}$, $15b_{-4}$, and $15b_{-5}$ of FIG. 7) are configured of: P-type MOS transistors $154c_{-1}$, $154c_{-2}$, $154c_{-3}$, $154c_{-4}$, and $154c_{-5}$ which function as resistor elements; and auxiliary pumping capacitors Cb1, Cb2, Cb3, Cb4, and Cb5, respectively. In the P-type MOS transistors $154c_{-1}$, $154c_{-2}$, $154c_{-3}$, $154c_{-4}$, and $154c_{-5}$, gates are connected to gates of the P-type MOS transistors $154a_{-1}$, $154a_{-2}$, $154a_{-3}$, $154a_{-4}$, and $154a_{-5}$ and the P-type MOS transistors $15_{-1}$, $15_{-2}$, $15_{-3}$, $15_{-4}$, and $15_{-5}$, respectively. One electrode of each of the auxiliary pumping capacitors Cb1, Cb2, Cb3, Cb4, and Cb5 is connected to each gate of the P-type MOS transistors $15_{-1}$, $15_{-2}$, $15_{-3}$, $15_{-4}$, and $15_{-5}$, respectively. One of the source and the drain of each of the P-type MOS transistors $154c_{-1}$, $154c_{-2}$, $154c_{-3}$, $154c_{-4}$, and $154c_{-5}$ is connected to each of nodes V0, V1, V2, V3, and V4 at the source of the P-type MOS transistors $15_{-1}$, $15_{-2}$, $15_{-3}$, $15_{-4}$, and $15_{-5}$, respectively. The other one of the source and the drain of each of the P-type MOS transistors $154c_{-1}$, $154c_{-2}$, $154c_{-3}$, $154c_{-4}$, and $154c_{-5}$ is connected to each gate of the P-type MOS transistors $154b_{-1}$, $154b_{-2}$, $154b_{-3}$, $154b_{-4}$, and $154b_{-5}$.

In addition, a back gate of the P-type MOS transistor $154c_{-1}$ is connected to each back gate B1 of the P-type MOS transistors $15_{-1}$, $154a_{-1}$, and $154b_{-1}$. A back gate of the P-type MOS transistor $154c_{-2}$ is connected to each back gate B2 of the P-type MOS transistors $15_{-2}$, $154a_{-2}$, and $154b_{-2}$. A back gate of the P-type MOS transistor $154c_{-3}$ is connected to each back gate B3 of the P-type MOS transistors $15_{-3}$, $154a_{-3}$, and $154b_{-3}$. A back gate of the P-type MOS transistor $154c_{-4}$ is connected to each back gate B4 of the P-type MOS transistors $15_{-4}$, $154a_{-4}$, and $154b_{-4}$. A back gate of the P-type MOS transistor $154c_{-5}$ is connected to each back gate B5 of the P-type MOS transistors $15_{-5}$, $154a_{-5}$, and $154b_{-5}$.

Similarly, the dynamic level converter circuits in a Dickson type charge pump $15D_{-2}$ of a second system (corresponding to $15b_{-1}$, $15b_{-2}$, $15b_{-3}$, $15b_{-4}$, and $15b_{-5}$ of FIG. 7) are configured of: P-type MOS transistors $154c_{-1}'$, $154c_{-2}'$, $154c_{-3}'$, $154c_{-4}'$, and $154c_{-5}'$ which function as resistor elements; and auxiliary pumping capacitors Cb1', Cb2', Cb3', Cb4', and Cb5', respectively. In the P-type MOS transistors $154c_{-1}'$, $154c_{-2}'$, $154c_{-3}'$, $154c_{-4}'$, and $154c_{-5}'$, gates are connected to gates of the P-type MOS transistors $154a_{-1}'$, $154a_{-2}'$, $154a_{-3}'$, $154a_{-4}'$, and $154a_{-5}'$ and the P-type MOS transistors $15_{-1}'$, $15_{-2}'$, $15_{-3}'$, $15_{-4}'$, and $15_{-5}'$, respectively. One electrode of each of the auxiliary pumping capacitors Cb1', Cb2', Cb3', Cb4', and Cb5' is connected to each gate of the P-type MOS transistors $15_{-1}'$, $15_{-2}'$, $15_{-3}'$, $15_{-4}'$, and $15_{-5}'$, respectively. One of the source and the drain of each of the P-type MOS transistors $154c_{-1}'$, $154c_{-2}'$, $154c_{-3}'$, $154c_{-4}'$, and $154c_{-5}'$, is connected to each of nodes V0', V1', V2', V3', and V4' at the source of the P-type MOS transistors $15_{-1}'$, $15_{-2}'$, $15_{-3}'$, $15_{-4}'$, and $15_{-5}'$. The other one of the source and the drain of each of the P-type MOS transistors $154c_{-1}'$, $154c_{-2}'$, $154c_{-3}'$, $154c_{-4}'$, and $154c_{-5}'$ is connected to each gate of the P-type MOS transistors $154b_{-1}'$, $154b_{-2}'$, $154b_{-3}'$, $154b_{-4}'$, and $154b_{-5}'$, respectively.

In addition, a back gate of the P-type MOS transistor $154c_{-1}'$ is connected to each back gate B1' of the P-type MOS transistors $15_{-1}'$, $154a_{-1}'$, and $154b_{-1}'$. A back gate of the P-type MOS transistor $154c_{-2}'$ is connected to each back gate B2' of the P-type MOS transistors $15_{-2}'$, $154a_{-2}'$, and $154b_{-2}'$. A back gate of the P-type MOS transistor $154c_{-3}'$ is connected to each back gate B3' of the P-type MOS transistors $15_{-3}'$, $154a_{-3}'$, and $154b_{-3}'$. A back gate of the P-type MOS transistor $154c_{-4}'$ is connected to each back gate B4' of the P-type MOS transistors $15_{-4}'$, $154a_{-4}'$, and $154b_{-4}'$. A back gate of the P-type MOS transistor $154c_{-5}'$ is connected to each back gate B5' of the P-type MOS transistors $15_{-5}'$, $154a_{-5}'$, and $154b_{-5}'$.

The dynamic level converter circuits in the Dickson type charge pump $15D_{-1}$ of the first system each branch a slight electric charge from each of the nodes V0, V1, V2, V3, and V4 at the source side of the P-type MOS transistors $15_{-1}$, $15_{-2}$, $15_{-3}$, $15_{-4}$, and $15_{-5}$, respectively, and stores the branched electric charge in the auxiliary pumping capacitors Cb1, Cb2, Cb3, Cb4, and Cb5. In this manner, an average electric potential of the gate signals G1, G2, G3, G4, and G5 is compensated for, namely, is set at an optimal value. Similarly, the dynamic level converter circuits in the Dickson type charge pump $15D_{-2}$ of the second system each branch a slight electric charge from each of the nodes V0', V1', V2', V3', and V4' at the source side of the P-type MOS transistors $15_{-1}'$, $15_{-2}'$, $15_{-3}'$, $15_{-4}'$, and $15_{-5}'$, respectively, and stores the branched electric charge in the auxiliary pumping capacitors Cb1', Cb2', Cb3', Cb4', and Cb5'. In this manner, an average electric potential of the gate signals G1', G2', G3', G4', and G5' is compensated for, namely, is set at an optimal value.

In the case where such a configuration is provided, the resistor elements configuring a dynamic level converter circuit can be replaced by single P-type MOS transistors $154c_{-1}$, $154c_{-2}$, $154c_{-3}$, $154c_{-4}$, and $154c_{-5}$ and $154c_{-1}'$, $154c_{-2}'$, $154c_{-3}'$, $154c_{-4}'$, and $154c_{-5}'$, respectively. Therefore, it becomes possible to reduce a process cost more remarkably, for example, to eliminate a process for manufacturing a resistor element. Hence, an irreversible nonvolatile semiconductor memory device using a gate oxide film destruction type anti-fuse element can be achieved more inexpensively.

In addition, a gate to source voltage, a gate to drain voltage, and a source to drain voltage each are equal to that of an external supply power source VDD at most, the voltages being applied to all of the P-type MOS transistors configuring this charge pump 15D. Thus, element reliability can be fully allocated.

Further, in all of the P-type MOS transistors, the electric potentials of the back gates B1, B2, B3, B4, and B5 and B1', B2', B3', B4', and B5' become always high electric potentials as compared with the electric potentials of the nodes V0, V1, V2, V3, V4, and V5 and V0', V1', V2', V3', V4', and V5' at the source side and at the drain side of the respective transistors. Therefore, there is no danger that a latch-up occurs. In contrast, in all of the P-type MOS transistors, the electric potentials of the back gates B1, B2, B3, B4, and B5 and B1', B2', B3', B4', and B5' never become an extremely high electric potential as compared with the electric potentials of the nodes V0, V1, V2, V3, V4, and V5 and V0', V1', V2', V3', V4', and V5' at the source side and at the drain side of the respective transistors. Thus, the current drive capability of the P-type MOS transistors is never lowered due to the influence of a back gate effect.

In this manner, according to the fifth embodiment described above, the current drive capabilities of the P-type MOS transistors $15_{-1}$, $15_{-2}$, $15_{-3}$, $15_{-4}$, and $15_{-5}$ and $15_{-1}'$, $15_{-2}'$, $15_{-3}'$, $15_{-4}'$, and $15_{-5}'$ can be improved. Therefore, it becomes possible to increase a supply current of this charge pump 15D. This effect is particularly significant in the case where the threshold voltage of the P-type MOS transistor is high.

In the case of this charge pump 15D as well, it is possible to configure pumping capacitors Ca1, Ca2, Ca3, and Ca4 and Ca1', Ca2', Ca3', and Ca4' and auxiliary pumping capacitors Cb1, Cb2, Cb3, Cb4, and Cb5 and Cb1', Cb2', Cb3', Cb4', and Cb5' so as to be driven by means of clock signals Φ1' and Φ2' synchronized with the clock signals Φ1 and Φ2.

In addition, it is possible to configure a negative charge pump using an N-type MOS transistor.

Sixth Embodiment

Figure 12:
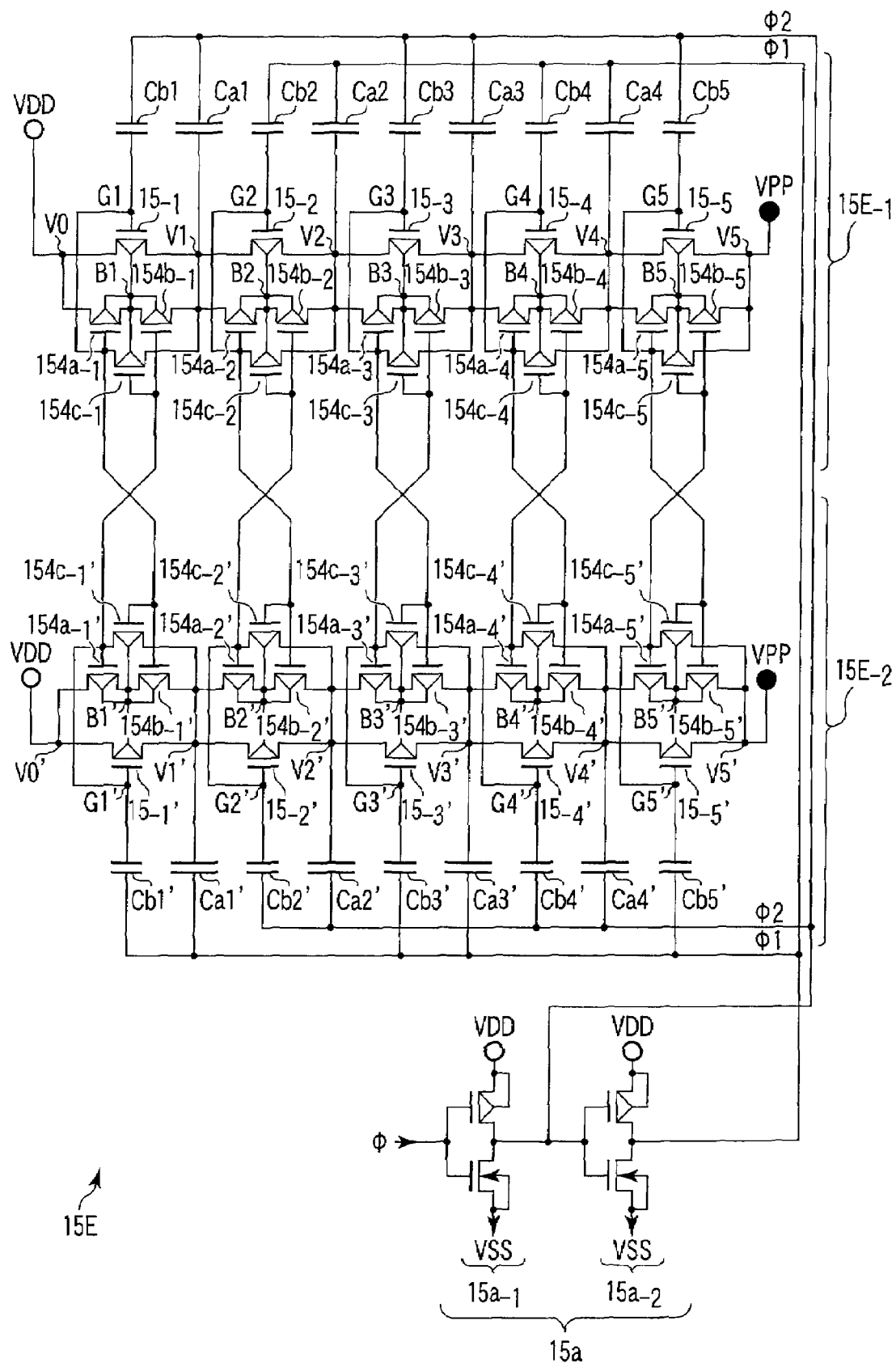
FIG. 12 is a circuit diagram depicting an example of a configuration of a charge pump (voltage increase charge pump) suitable for use in the irreversible nonvolatile semiconductor memory device according to a sixth embodiment of the present invention.

FIG. 12 shows an example of a configuration of a charge pump in accordance with a sixth embodiment of the present invention. The present embodiment also describes a charge pump suitable for use as a voltage increase charge pump in an irreversible nonvolatile semiconductor memory device using a gate oxide film destruction type anti-fuse element. In addition, the present embodiment describes an example in which a Dickson type charge pump having a five-stage structure in which five P-type MOS transistors serving as current rectifier elements are connected in series is prepared in two systems, and gate signals of the P-type MOS transistors in the respective systems are cross-coupled with each other. Like constituent elements of the charge pump shown in FIG. 11 are designated by like reference numerals. A detailed description thereof is omitted here.

According to the sixth embodiment, an inlet port of an electric charge for compensating for an average electric potential of dynamic level converter circuits (gate signals), of the charge pump 15D in the fifth embodiment described above, is changed from each of the nodes at the source side of the P-type MOS transistor (current rectifier element) to each of the nodes at the drain side. That is, in this charge pump 15E, dynamic level converter circuits in a Dickson type charge pump $15E_{-1}$ of a first system (corresponding to $15b_{-1}$, $15b_{-2}$, $15b_{-3}$, $15b_{-4}$, and $15b_{-5}$ of FIG. 7) are composed of P-type MOS transistors $154c_{-1}$, $154c_{-2}$, $154c_{-3}$, $154c_{-4}$, and $154c_{-5}$ serving as resistor elements and auxiliary pumping capacitors Cb1, Cb2, Cb3, Cb4, and Cb5, respectively. In the P-type MOS transistors $154c_{-1}$, $154c_{-2}$, $154c_{-3}$, $154c_{-4}$, and $154c_{-5}$, gates are connected to gates of the P-type MOS transistors $154b_{-1}$, $154b_{-2}$, $154b_{-3}$, $154b_{-4}$, and $154b_{-5}$. One of the source and the drain of each of the P-type MOS transistors $154c_{-1}$, $154c_{-2}$, $154c_{-3}$, $154c_{-4}$, and $154c_{-5}$ is connected to each gate of the P-type MOS transistors $154a_{-1}$, $154a_{-2}$, $154a_{-3}$, $154a_{-4}$, and $154a_{-5}$ and each gate of the P-type MOS transistors $15_{-1}$, $15_{-2}$, $15_{-3}$, $15_{-4}$, and $15_{-5}$. One electrode of each of the above auxiliary pumping capacitors Cb1, Cb2, Cb3, Cb4, and Cb5 is connected to each gate of the P-type MOS transistors $15_{-1}$, $15_{-2}$, $15_{-3}$, $15_{-4}$, and $15_{-5}$. The other one of the source and the drain of each of the P-type MOS transistors $154c_{-1}$, $154c_{-2}$, $154c_{-3}$, $154c_{-4}$, and $154c_{-5}$ is connected to each of nodes V1, V2, V3, V4, and V5 at the drain side of the P-type MOS transistors $15_{-1}$, $15_{-2}$, $15_{-3}$, $15_{-4}$, and $15_{-5}$, respectively.

In addition, a back gate of the P-type MOS transistor $154c_{-1}$ is connected to each back gate B1 of the P-type MOS transistors $15_{-1}$, $154a_{-1}$, and $154b_{-1}$. A back gate of the P-type MOS transistor $154c_{-2}$ is connected to each back gate B2 of the P-type MOS transistors $15_{-2}$, $154a_{-2}$, and $154b_{-2}$. A back gate of the P-type MOS transistor $154c_{-3}$ is connected to each back gate B3 of the P-type MOS transistors $15_{-3}$, $154a_{-3}$, and $154b_{-3}$. A back gate of the P-type MOS transistor $154c_{-4}$ is connected to each back gate B4 of the P-type MOS transistors $15_{-4}$, $154a_{-4}$, and $154b_{-4}$. A back gate of the P-type MOS transistor $154c_{-5}$ is connected to each back gate B5 of the P-type MOS transistors $15_{-5}$, $154a_{-5}$, and $154b_{-5}$.

Similarly, the dynamic level converter circuits in a Dickson type charge pump $15E_{-2}$ of a second system (corresponding to $15b_{-1}$, $15b_{-2}$, $15b_{-3}$, $15b_{-4}$, and $15_{-5}$ of FIG. 7) are composed of: P-type MOS transistors $154c_{-1}'$, $154c_{-2}'$, $154c_{-3}'$, $154c_{-4}'$, and $154c_{-5}'$ that function as resistor elements and auxiliary pumping capacitors Cb1', Cb2', Cb3', Cb4', and Cb5', respectively. In the P-type MOS transistors $154c_{-1}$, $154c_{-2}'$, $154c_{-3}'$, $154c_{-4}'$, and $154c_{-5}'$, gates are connected to gates of the P-type MOS transistors $154b_{-1}'$, $154b_{-2}'$, $154b_{-3}'$, $154b_{-4}'$, and $154b_{-5}'$. One of the source and the drain of the P-type MOS transistors $154c_{-1}'$, $154c_{-2}'$, $154c_{-3}'$, $154c_{-4}'$, and $154c_{-5}'$ is connected to each gate of the P-type MOS transistors $154a_{-1}'$, $154a_{-2}'$, $154a_{-3}'$, $154a_{-4}'$, and $154a_{-5}'$ and each gate of the P-type MOS transistors $15_{-1}'$, $15_{-2}'$, $15_{-3}'$, $15_{-4}'$, and $15_{-5}'$, respectively. One electrode of each of the above auxiliary pumping capacitors Cb1', Cb2', Cb3', Cb4', and Cb5' is connected to each gate of the P-type MOS transistors $15_{-1}'$, $15_{-2}'$, $15_{-3}'$, $15_{-4}'$, and $15_{-5}'$. The other one of the source and the drain of each of the P-type MOS transistors $154c_{-1}'$, $154c_{-2}'$, $154c_{-3}'$, $154c_{-4}'$, and $154c_{-5}'$ is connected to each of nodes V1', V2', V3', V4', and V5' at the drain side of the P-type MOS transistors $15_{-1}'$, $15_{-2}'$, $15_{-3}'$, $15_{-4}'$, and $15_{-5}'$.

In addition, a back gate of the P-type MOS transistor $154c_{-1}'$ is connected to each back gate B1' of the P-type MOS transistors $15_{-1}'$, $154a_{-1}'$, and $154b_{-1}'$. A back gate of the P-type MOS transistor $154c_{-2}'$ is connected to each back gate B2' of the P-type MOS transistors $15_{-2}'$, $154a_{-2}'$, and $154b_{-2}'$. A back gate of the P-type MOS transistor $154c_{-3}'$ is connected to each back gate B3' of the P-type MOS transistors $15_{-3}'$, $154a_{-3}'$, and $154b_{-3}'$. A back gate of the P-type MOS transistor $154c_{-4}'$ is connected to each back gate B4' of the P-type MOS transistors $15_{-4}'$, $154a_{-4}'$, and $154b_{-4}'$. A back gate of the P-type MOS transistor $154c_{-5}'$ is connected to each back gate B5' of the P-type MOS transistors $15_{-5}'$, $154a_{-5}'$, and $154b_{-5}'$.

The dynamic level converter circuits in the Dickson type charge pump $15E_{-1}$ of the first system each branch a slight electric charge from each of the nodes V1, V2, V3, V4, and V5 at the drain side of the P-type MOS transistors $15_{-1}$, $15_{-2}$, $15_{-3}$, $15_{-4}$, and $15_{-5}$, respectively, and stores the branched electric charge in the auxiliary pumping capacitors Cb1, Cb2, Cb3, Cb4, and Cb5. In this manner, an average electric potential of the gate signals G1, G2, G3, G4, and G5 is compensated for, namely, is set at an optimal value. Similarly, the dynamic level converter circuits in the Dickson type charge pump $15E_{-2}$ of the second system each branch a slight electric charge from each of the nodes V1', V2', V3', V4', and V5' at the drain side of the P-type MOS transistors $15_{-1}'$, $15_{-2}'$, $15_{-3}'$, $15_{-4}'$, and $15_{-5}'$, respectively, and stores the branched electric charge in the auxiliary pumping capacitors Cb1', Cb2', Cb3', Cb4', and Cb5'. In this manner, an average electric potential of the gate signals G1', G2', G3', G4', and G5' is compensated for, namely, is set at an optimal value.

In the case where such a configuration is provided as well, advantageous effect substantially similar to that in the case of the fifth embodiment described previously can be attained.

That is, the resistor elements configuring a dynamic level converter circuit can be replaced by single P-type MOS transistors $154c_{-1}$, $154c_{-2}$, $154c_{-3}$, $154c_{-4}$, and $154c_{-5}$ and $154c_{-1}'$, $154c_{-2}'$, $154c_{-3}'$, $154c_{-4}'$, and $154c_{-5}'$, respectively. Therefore, it becomes possible to reduce a process cost more remarkably, for example, to eliminate a process for manufacturing a resistor element. Hence, an irreversible nonvolatile semiconductor memory device using a gate oxide film destruction type anti-fuse element can be achieved more inexpensively.

Moreover, the inlet ports of electric charges of the dynamic level converter circuits are defined as nodes V1, V2, V3, V4, and V5 and V1', V2', V3', V4', and V5' at the drain side of the P-type MOS transistors $15_{-1}$, $15_{-2}$, $15_{-3}$, $15_{-4}$, and $15_{-5}$ and $15_{-1}'$, $15_{-2}'$, $15_{-3}'$, $15_{-4}'$, and $15_{-5}'$, respectively. In this manner, the electric potentials of the gate signals G1, G2, G3, G4, and G5 and G1', G2', G3', G4', and G5 can be set to be slightly higher than those of the gate signals G1, G2, G3, G4, and G5 and G1', G2', G3', G4', and G5' in the case of the fifth embodiment. In this case, although the current drive capabilities of the P-type MOS transistors $15_{-1}$, $15_{-2}$, $15_{-3}$, $15_{-4}$, and $15_{-5}$ and $15_{-1}'$, $15_{-2}'$, $15_{-3}'$, $15_{-4}'$, and $15_{-5}'$ are lowered, it becomes possible to restrict a cutoff current at the time of a nonconductive state to be small.

In this manner, according to the sixth embodiment described above, a cutoff current at the time of a nonconductive state, of the P-type MOS transistors $15_{-1}$, $15_{-2}$, $15_{-3}$, $15_{-4}$, and $15_{-5}$ and $15_{-1}'$, $15_{-2}'$, $15_{-3}'$, $15_{-4}'$, and $15_{-5}'$, can be restricted to be small. Therefore, it becomes possible to increase a rate of this charge pump 15E to current consumption, namely, to increase current efficiency. This advantageous effect is particularly significant in the case where the threshold voltage of the P-type MOS transistor is low.

In the case of this charge pump 15E as well, it is possible to configure pumping capacitors Ca1, Ca2, Ca3, and Ca4 and Ca1', Ca2', Ca3', and Ca4' and auxiliary pumping capacitors Cb1, Cb2, Cb3, Cb4, and Cb5 and Cb1', Cb2', Cb3', Cb4', and Cb5' so as to be driven by means of clock signals Φ1' and Φ2' synchronized with the clock signals Φ1 and Φ2.

In addition, it is possible to configure a negative charge pump using an N-type MOS transistor.

As has been described above, according to the first to sixth embodiments of the present invention, an irreversible nonvolatile semiconductor memory device using a gate oxide film destruction type anti-fuse element can be achieved inexpensively.

In particular, in any of the embodiments, a pumping capacitor and an auxiliary pumping capacitor can be configured using a MOS transistor.

In addition, of course, the number of current rectifier elements is not limited to the number of stages according to the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor charge pump for two systems, comprising:
a plurality of P-channel MOS (Metal Oxide Semiconductor) transistors which configure current rectifier elements, respectively, said plurality of P-channel MOS transistors having gates and being connected in series between an external supply power source and a voltage increase output power source;

a plurality of first pumping capacitors one electrode of each of which is connected to a connection point of each of said plurality of P-channel MOS transistors;

a clock signal generating circuit which generates first and second clock signals whose phases are different from each other by 180 degrees, the first and second clock signals being alternately supplied from the clock signal generating circuit to the other electrodes of said plurality of first pumping capacitors;

a plurality of resistor elements connected to connection points of said plurality of P-channel MOS transistors at one end and connected to gates of said plurality of P-channel MOS transistors at the other end; and a plurality of second pumping capacitors one electrode of each of which is connected to the other end of each of said plurality of resistor elements, the first and second clock signals being alternately supplied to the other electrodes of said plurality of second pumping capacitors, thereby generating control signals which control gates of said plurality of P-channel MOS transistors, wherein, by means of the control signal generated by said plurality of second pumping capacitors in the semiconductor charge pump for one system, gates of said plurality of P-channel MOS transistors in the semiconductor charge pump for the other system are controlled.

2. The semiconductor charge pump according to claim 1, wherein said plurality of resistor elements are composed of MOS transistors, respectively.

3. The semiconductor charge pump according to claim 1, wherein the first and second clock signals are rectangular wave clock signals that become VSS at a low electric potential side and that become VDD at a high electric potential side.

4. The semiconductor charge pump according to claim 1, wherein said plurality of P-channel MOS transistors have back gates, and bias circuits are connected to the back gates, respectively.

5. The semiconductor charge pump according to claim 1, wherein the first and second clock signals are supplied in a reverse manner with respect to said plurality of first and second pumping capacitors of the respective systems.

* * * * *

UNITED STATES PATENT AND TRADEMARK OFFICE
CERTIFICATE OF CORRECTION

PATENT NO.         : 7,532,062 B2
APPLICATION NO.    : 12/138005
DATED              : May 12, 2009
INVENTOR(S)        : Namekawa et al.

Page 1 of 1

It is certified that error appears in the above-identified patent and that said Letters Patent is hereby corrected as shown below:

On the title page, Item (73), the Assignee's information is incorrect. Item (73) should read:

-- ( 73 ) Assignee: Kabushiki Kaisha Toshiba, Tokyo (JP) --

Signed and Sealed this

Seventh Day of July, 2009

JOHN DOLL
*Acting Director of the United States Patent and Trademark Office*